Figure 1:
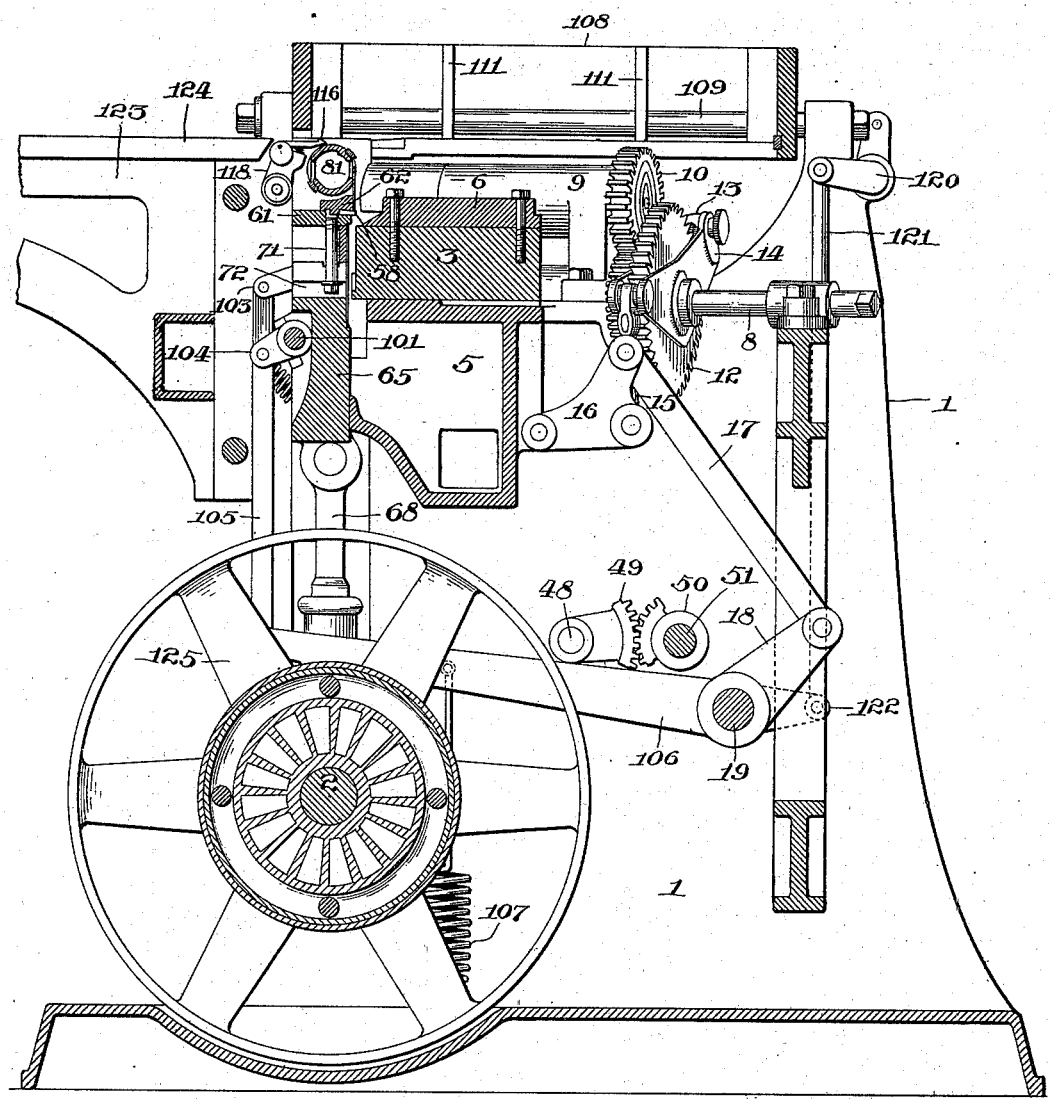

(No Model.)  18 Sheets—Sheet 1.

J. C. DONNELLY.
MATCH MAKING MACHINE.

No. 565,674. Patented Aug. 11, 1896.

Witnesses.  
A. H. Groups  
A. V. Blackwood.

Inventor.  
Joseph C. Donnelly,  
per John R. Nolan  
Attorney.

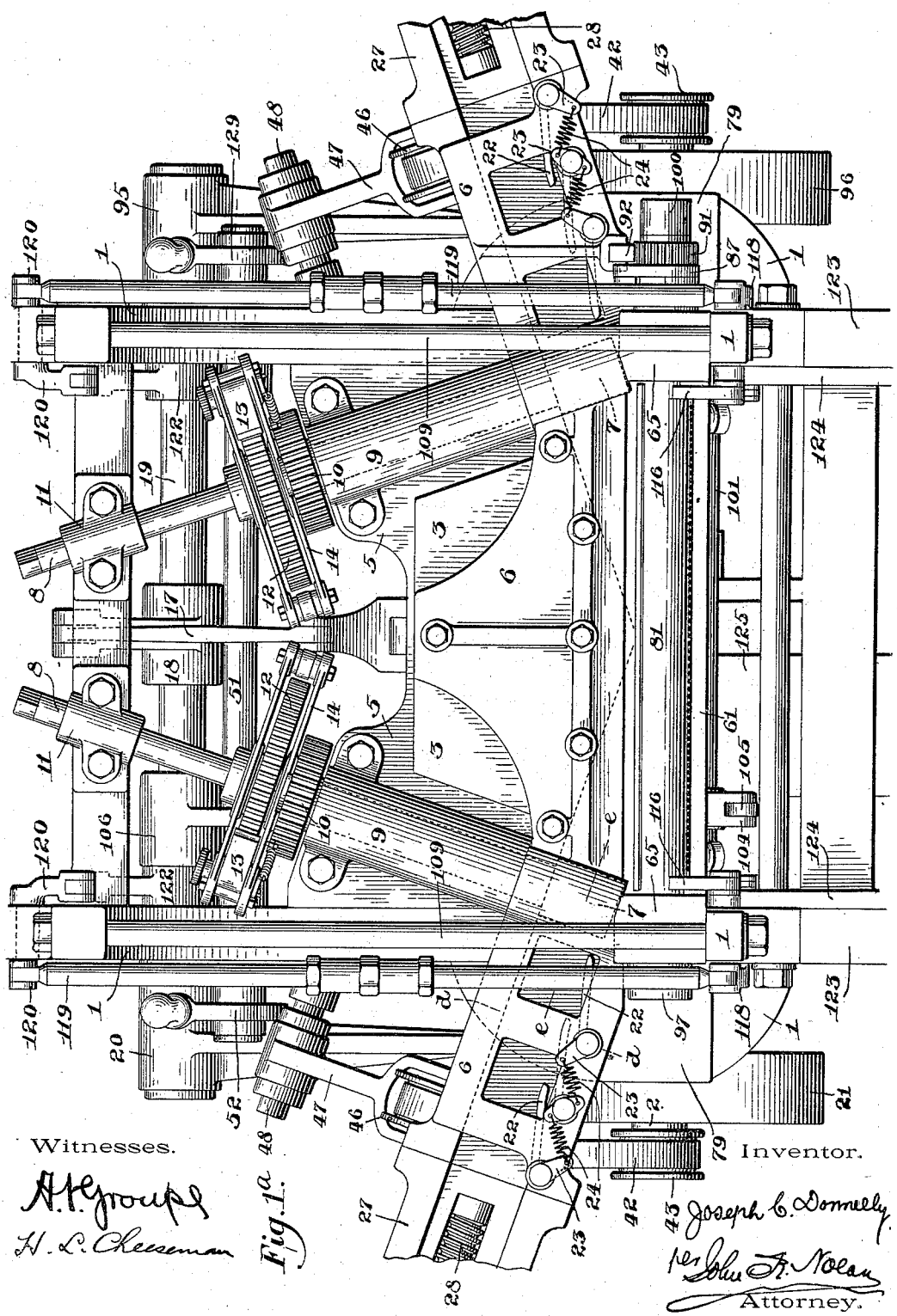

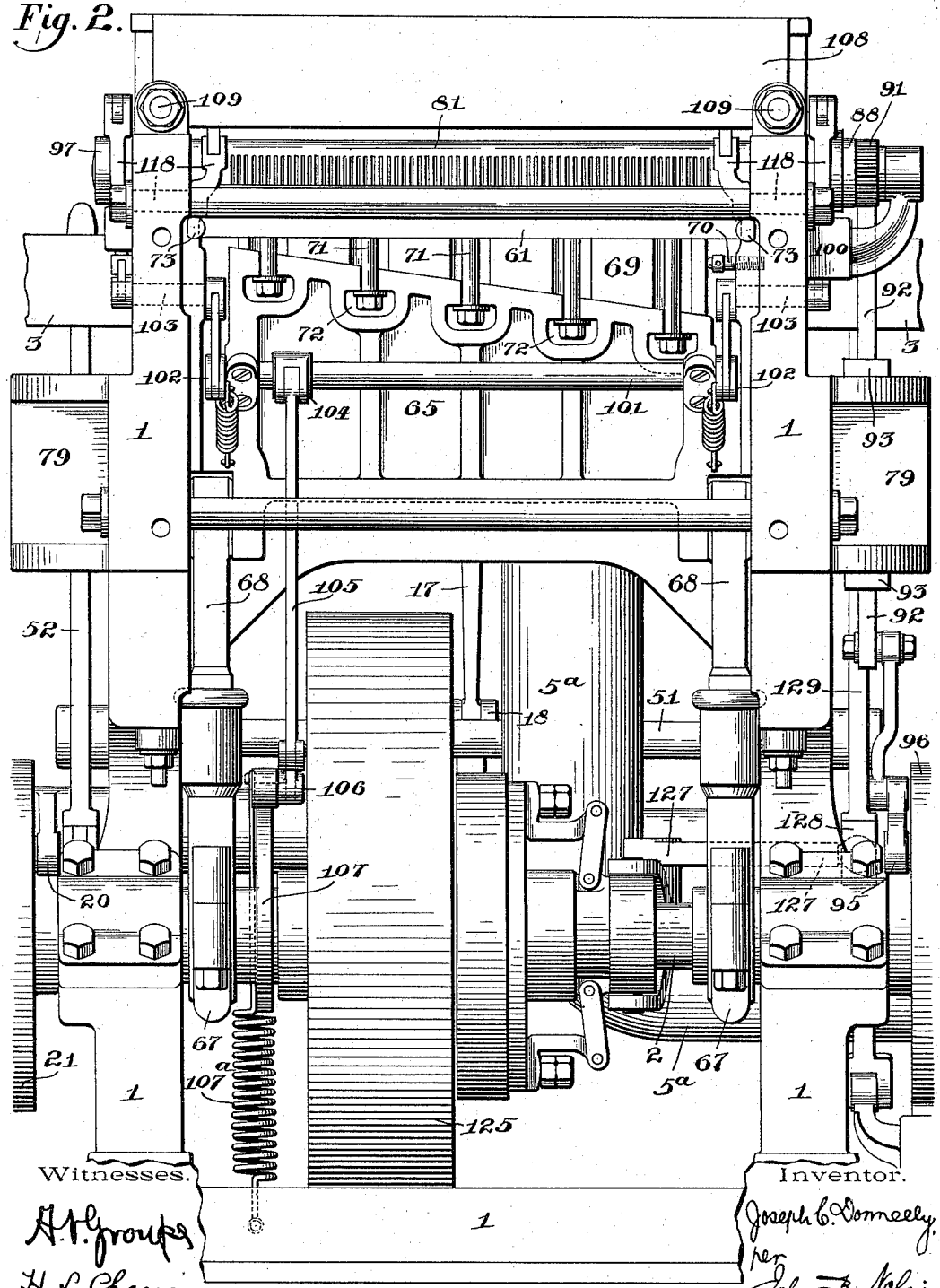

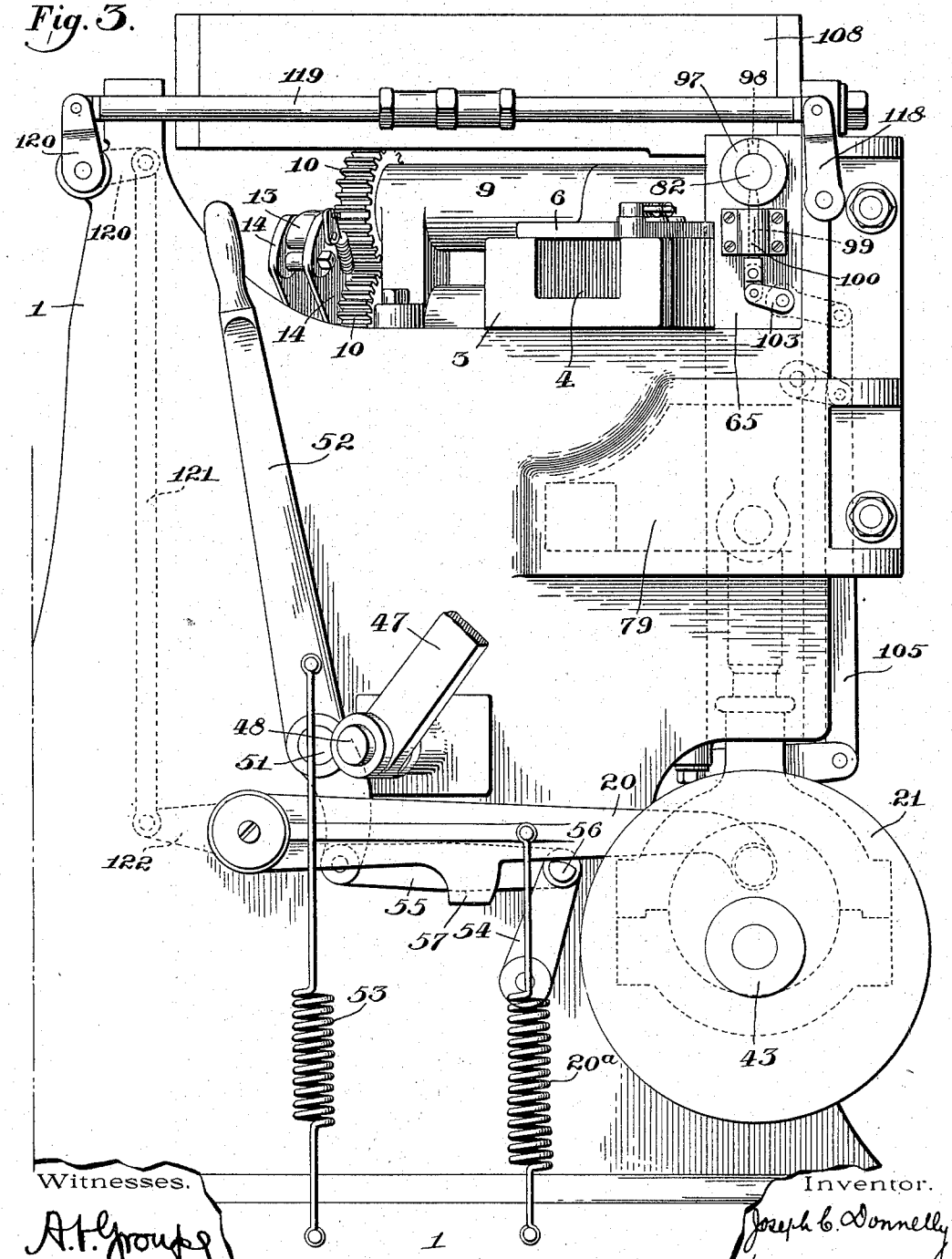

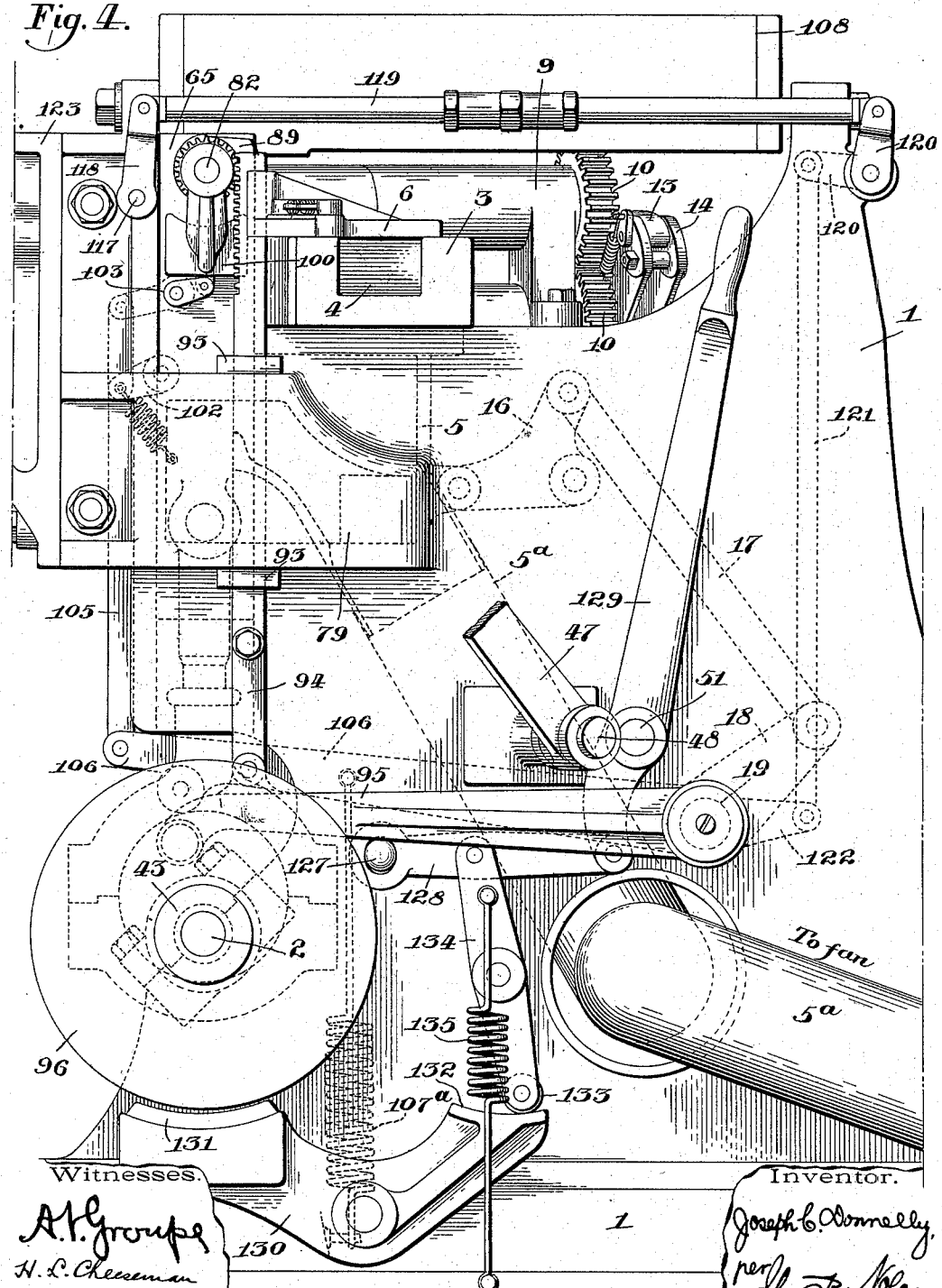

(No Model.) 18 Sheets—Sheet 6.
J. C. DONNELLY.
MATCH MAKING MACHINE.
No. 565,674. Patented Aug. 11, 1896.
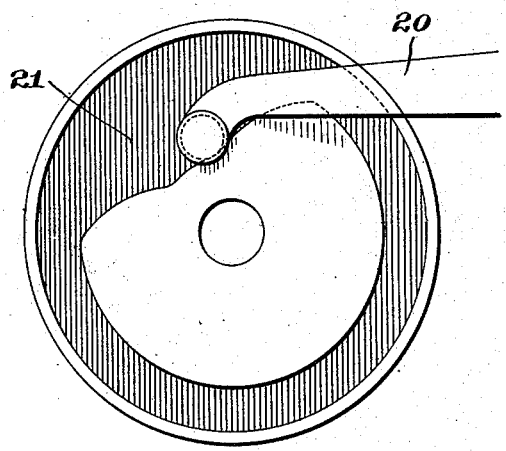
Fig. 5.
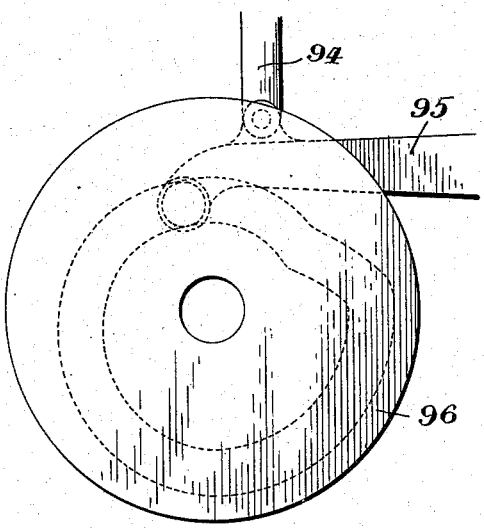
Fig. 6.
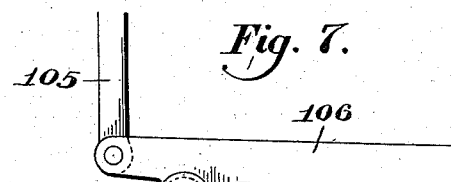
Fig. 7.
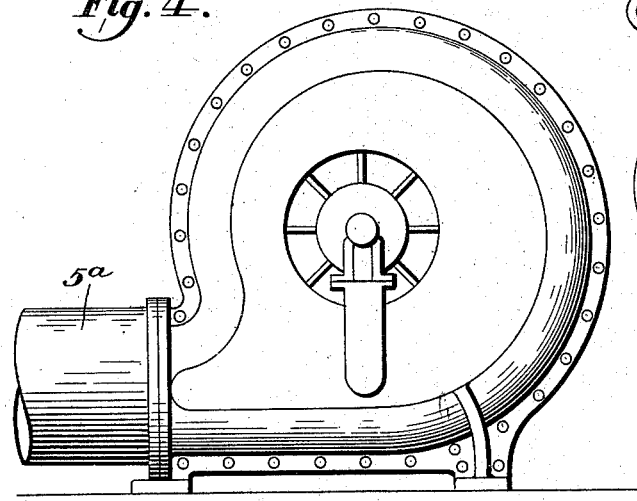
Fig. 4.ª
Witnesses.
A. V. Groupe
H. L. Cheeseman
Inventor.
Joseph C. Donnelly,
per John F. Nolan
Attorney.
THE NORRIS PETERS CO., PHOTO-LITHO., WASHINGTON, D. C.

(No Model.)
18 Sheets—Sheet 7.
J. C. DONNELLY.
MATCH MAKING MACHINE.
No. 565,674.  Patented Aug. 11, 1896.
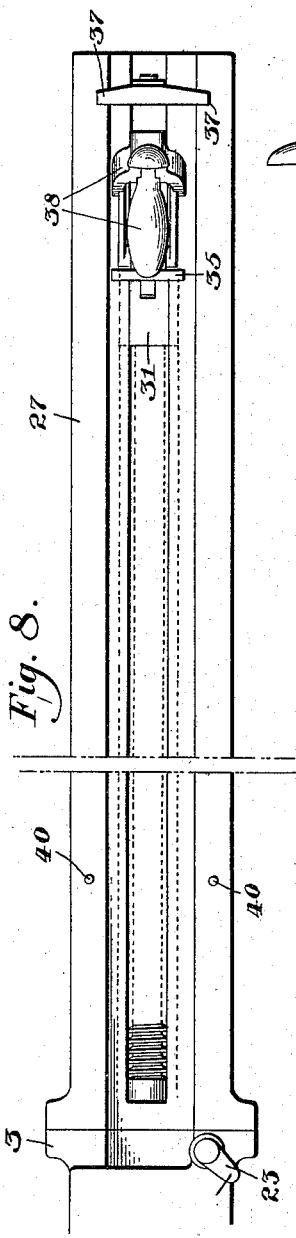
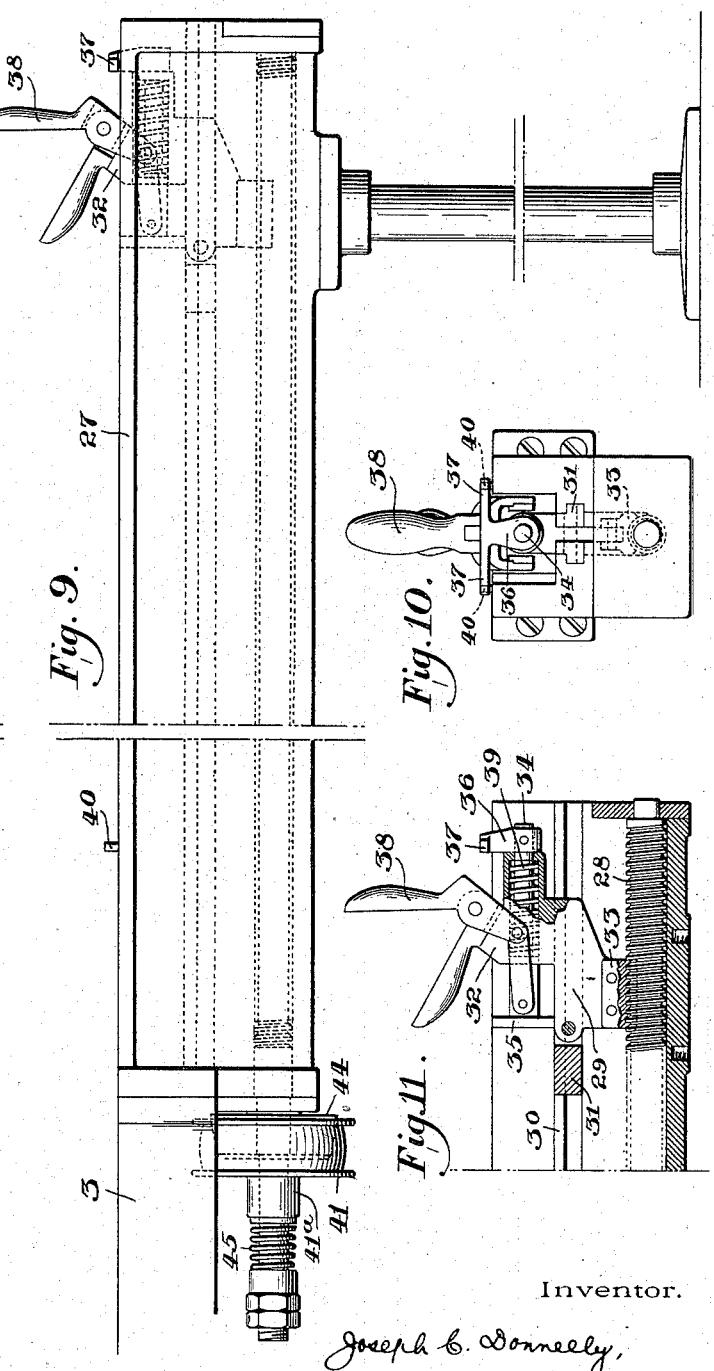
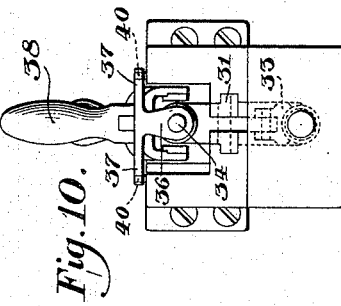
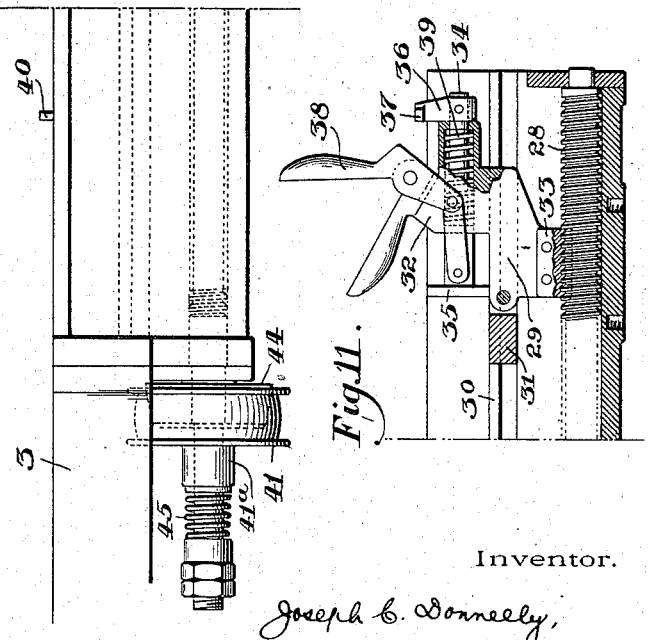
Witnesses.
A. T. Groups
H. L. Cheeseman
Inventor.
Joseph C. Donnelly,
per John R. Nolan
Attorney.

(No Model.)

J. C. DONNELLY.
MATCH MAKING MACHINE.

No. 565,674.

Patented Aug. 11, 1896.

18 Sheets—Sheet 8.

Witnesses.
A. V. Groups
H. L. Cheeseman

Inventor.
Joseph C. Donnelly
per John F. Nolan
Attorney.

(No Model.)  18 Sheets—Sheet 9.
J. C. DONNELLY.
MATCH MAKING MACHINE.
No. 565,674. Patented Aug. 11, 1896.
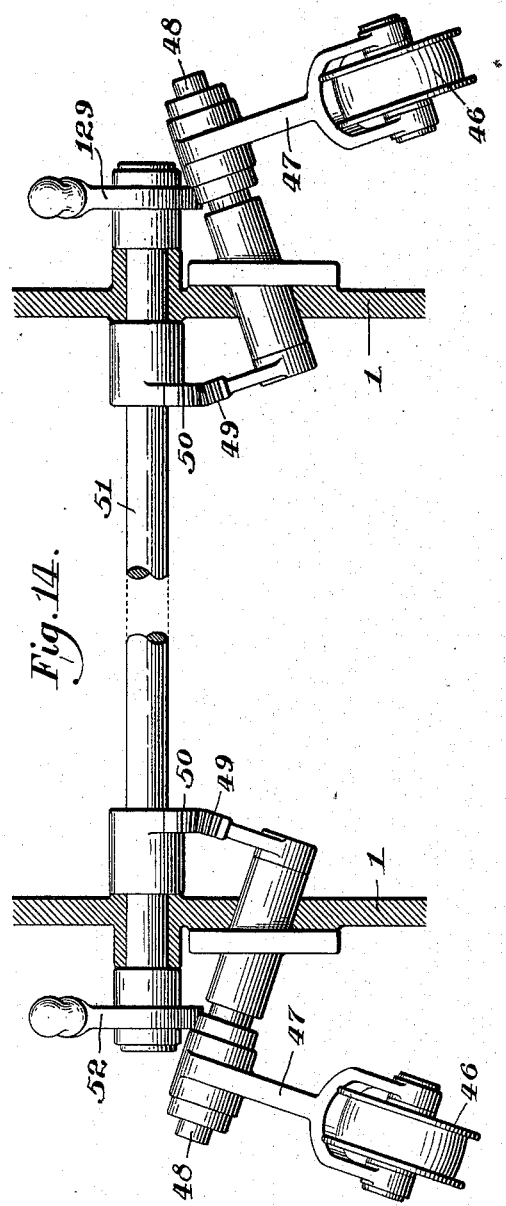
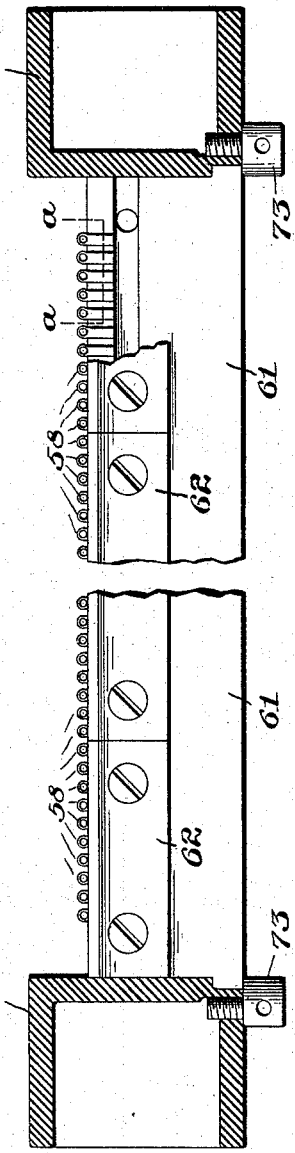
Witnesses.
A. T. Group
H. L. Cheeseman
Inventor.
Joseph C. Donnelly,
per John F. Nolan
Attorney.

(No Model.)  18 Sheets—Sheet 10.
J. C. DONNELLY.
MATCH MAKING MACHINE.
No. 565,674.  Patented Aug. 11, 1896.
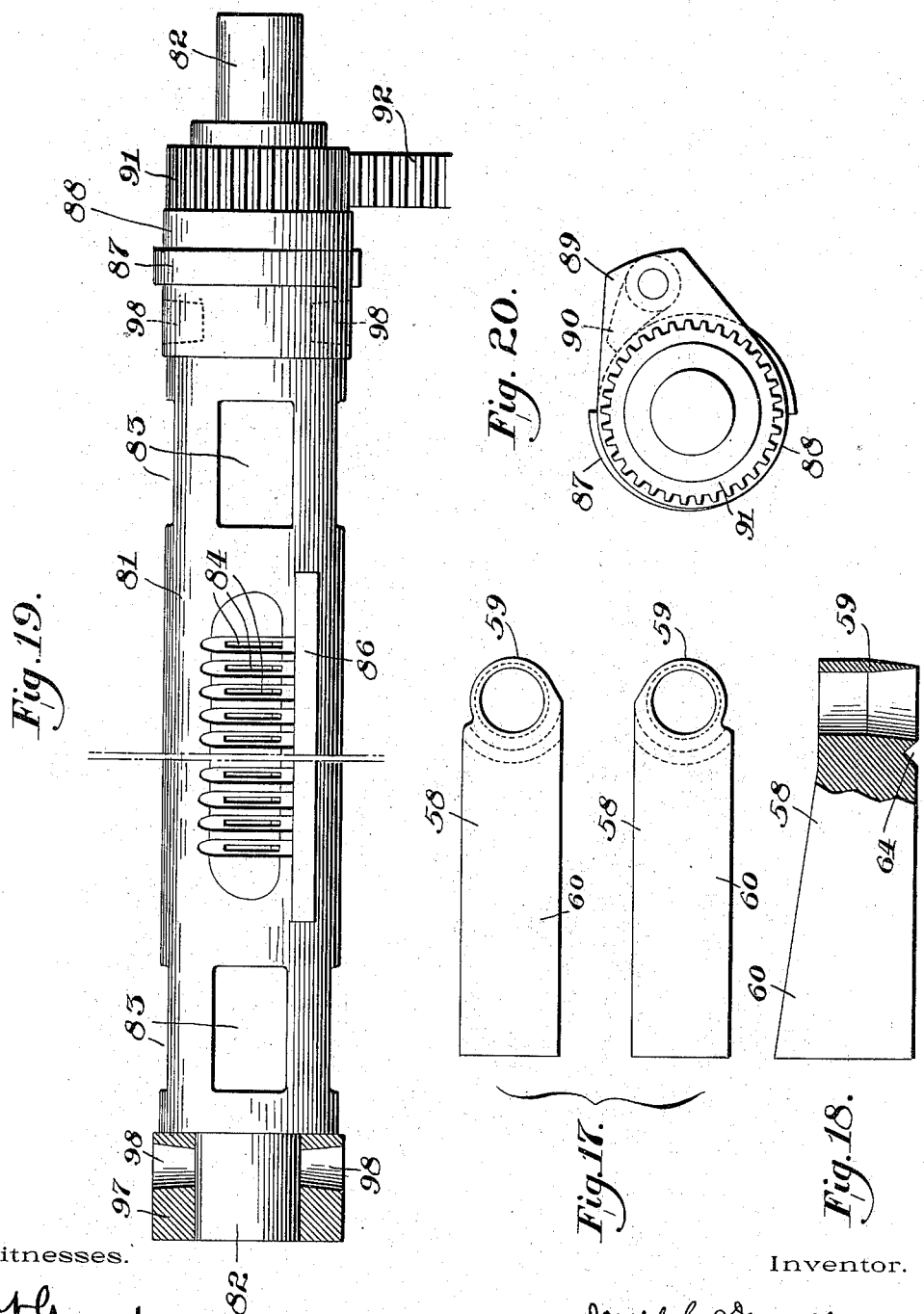
Witnesses.  Inventor.

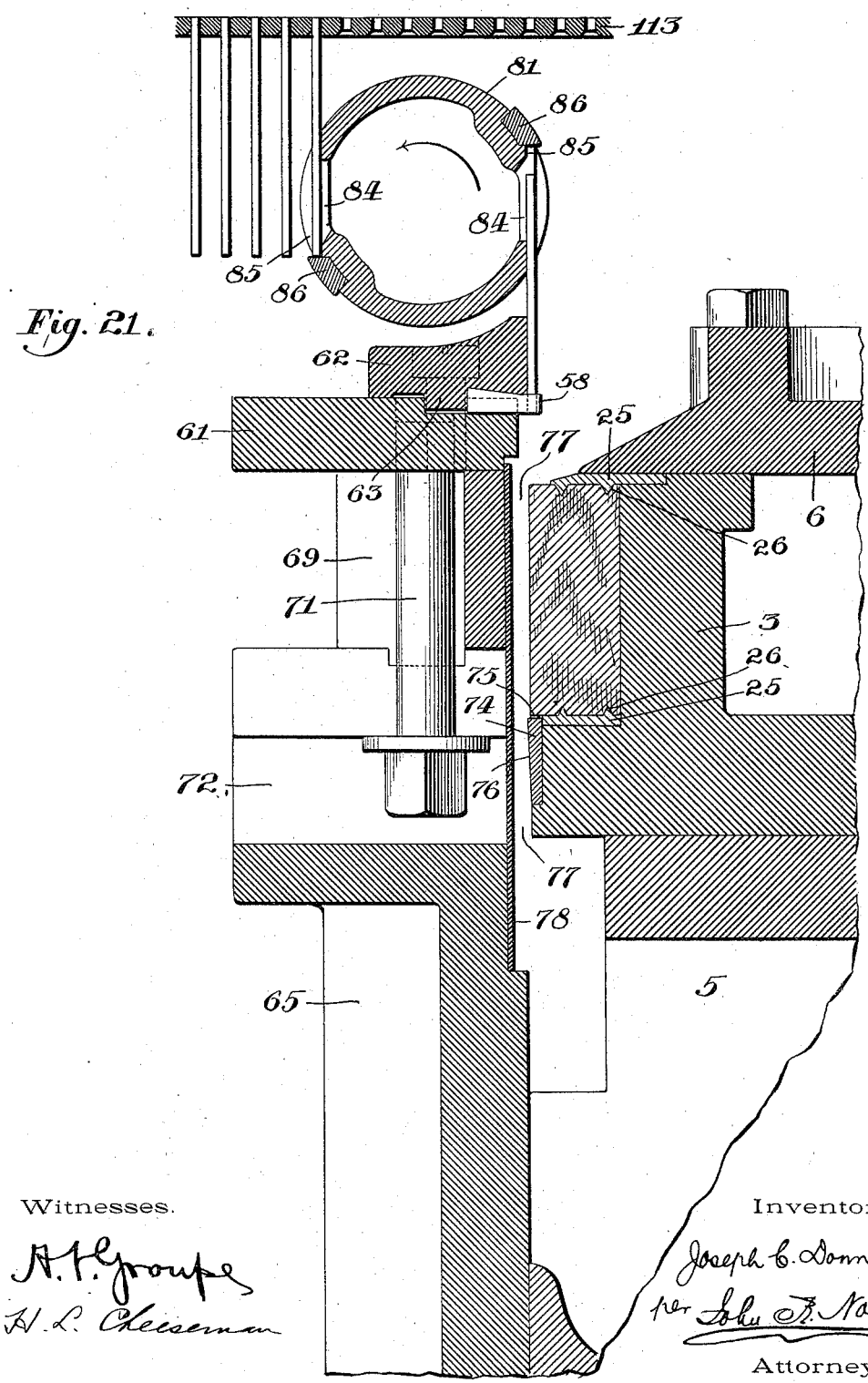

(No Model.) 18 Sheets—Sheet 12.
J. C. DONNELLY.
MATCH MAKING MACHINE.

No. 565,674. Patented Aug. 11, 1896.

Witnesses. Inventor.
Joseph C. Donnelly,
per John F. Nolan
Attorney.

(No Model.)  18 Sheets—Sheet 13.
J. C. DONNELLY.
MATCH MAKING MACHINE.
No. 565,674. Patented Aug. 11, 1896.
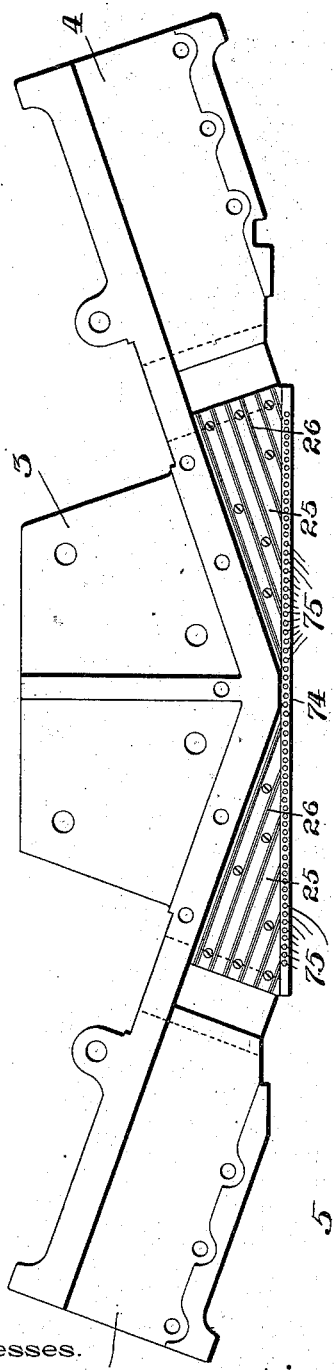
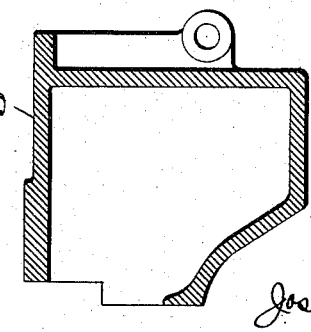
Witnesses.
A. T. Groupe
H. L. Cheeseman
Inventor.
Joseph C. Donnelly,
per John F. Nolan
Attorney.

(No Model.) 18 Sheets—Sheet 14.

J. C. DONNELLY.
MATCH MAKING MACHINE.

No. 565,674. Patented Aug. 11, 1896.

Witnesses.
A. T. Groups
H. L. Cheeseman

Inventor.
Joseph C. Donnelly,
per John F. Nolan
Attorney.

(No Model.)
18 Sheets—Sheet 15.
J. C. DONNELLY.
MATCH MAKING MACHINE.
No. 565,674.
Patented Aug. 11, 1896.
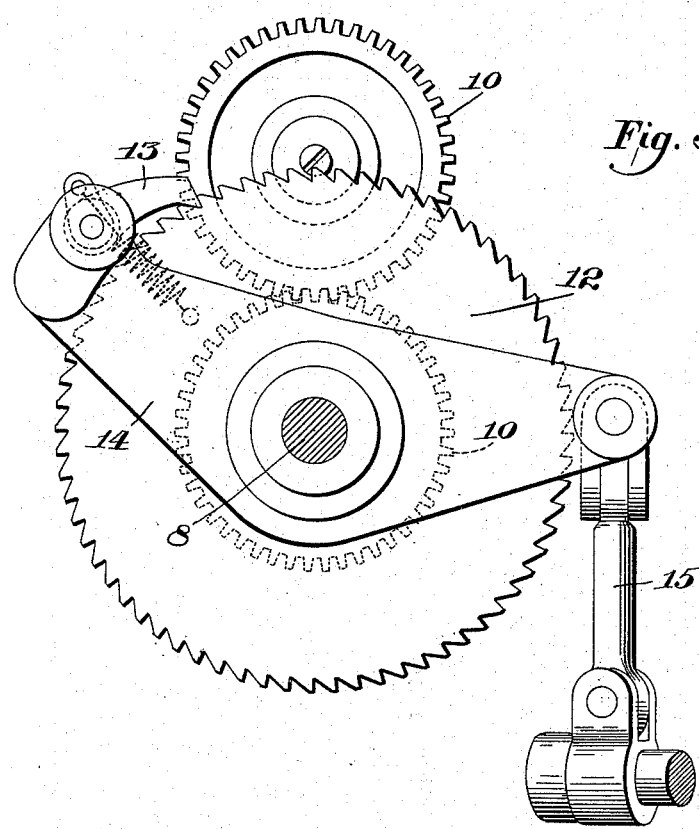
Fig. 30.
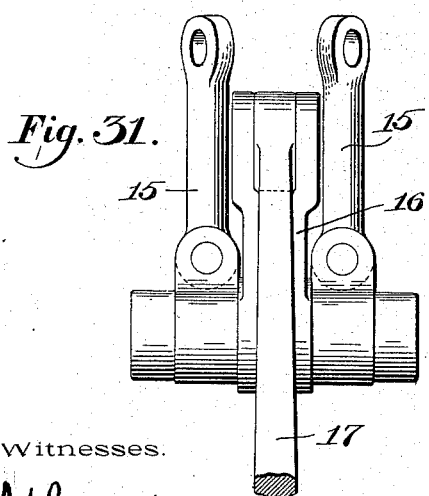
Fig. 31.
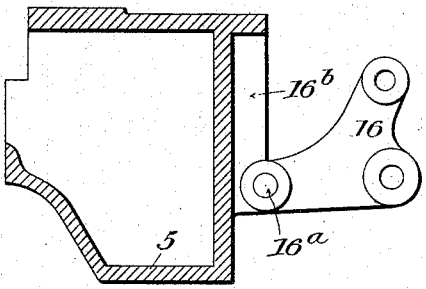
Fig. 31ª.
Witnesses.
A. T. Groupe
H. L. Cheeseman
Inventor.
Joseph C. Donnelly,
per John R. Nolan
Attorney.

(No Model.)  18 Sheets—Sheet 16.
J. C. DONNELLY.
MATCH MAKING MACHINE.

No. 565,674.  Patented Aug. 11, 1896.

Witnesses.  Inventor.

Joseph C. Donnelly,
per John F. Nolan,
Attorney.

(No Model.)  18 Sheets—Sheet 17.
J. C. DONNELLY.
MATCH MAKING MACHINE.
No. 565,674. Patented Aug. 11, 1896.
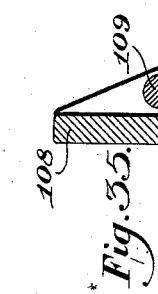
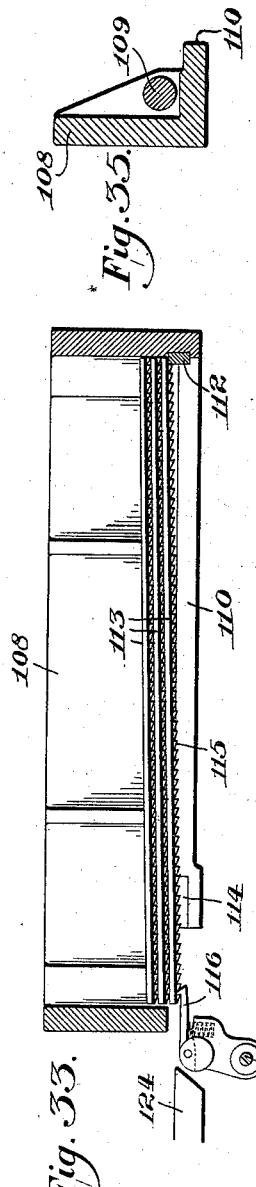
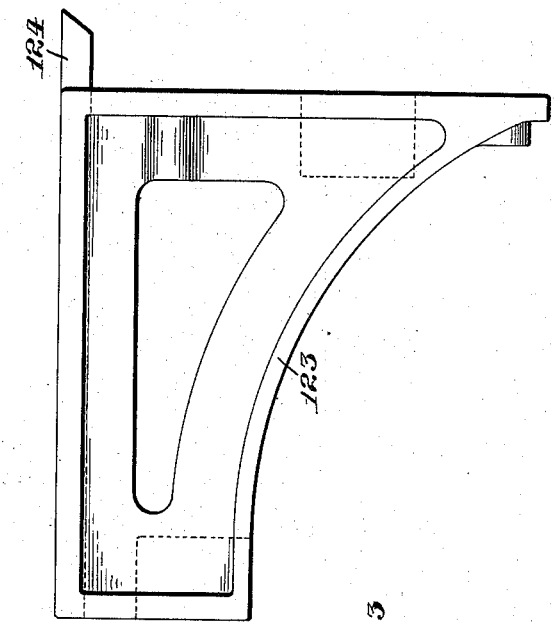
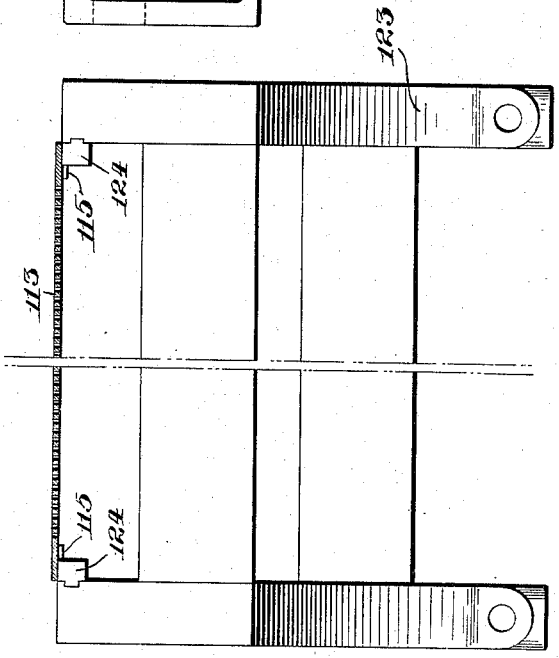
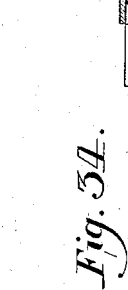
Witnesses.
A. F. Groups
H. L. Cheeseman
Inventor.
Joseph C. Donnelly
per John F. Nolan
Attorney.

(No Model.)  
J. C. DONNELLY.  
MATCH MAKING MACHINE.

No. 565,674. Patented Aug. 11, 1896.

18 Sheets—Sheet 18.

Witnesses.  
Inventor.  
Joseph C. Donnelly,  
per John F. Nolan  
Attorney.

UNITED STATES PATENT OFFICE.

JOSEPH C. DONNELLY, OF PHILADELPHIA, PENNSYLVANIA.

MATCH-MAKING MACHINE.

SPECIFICATION forming part of Letters Patent No. 565,674, dated August 11, 1896.

Application filed October 1, 1895. Serial No. 564,285. (No model.)

*To all whom it may concern:*

Be it known that I, JOSEPH C. DONNELLY, a citizen of the United States, residing at the city and county of Philadelphia and State of Pennsylvania, have invented certain new and useful Improvements in Match-Making Machines, of which the following is a full, clear, and exact description, reference being had to the accompanying drawings, forming a part of this specification.

This invention relates to machines for making matches, having reference more especially to mechanism for cutting splints from the block and assembling them row by row in suitable plates or holders, by means of which the dipping or "heading" operation may be expeditiously effected; and to this end the invention comprehends a novel construction and arrangement of block-feeding hoppers and of coacting feed mechanism therefor; a novel construction and arrangement of the cutters and of their supporting and operating parts; a novel construction of transfer mechanism for receiving the splints and introducing them to the dipping plates or holders; a novel construction and arrangement of the plate-supply hopper, and of the devices for removing the plates in respect to the transfer mechanism, and also various novel features of construction and organization of parts whereby advantages are gained, as will be hereinafter described and claimed.

Figure 12:
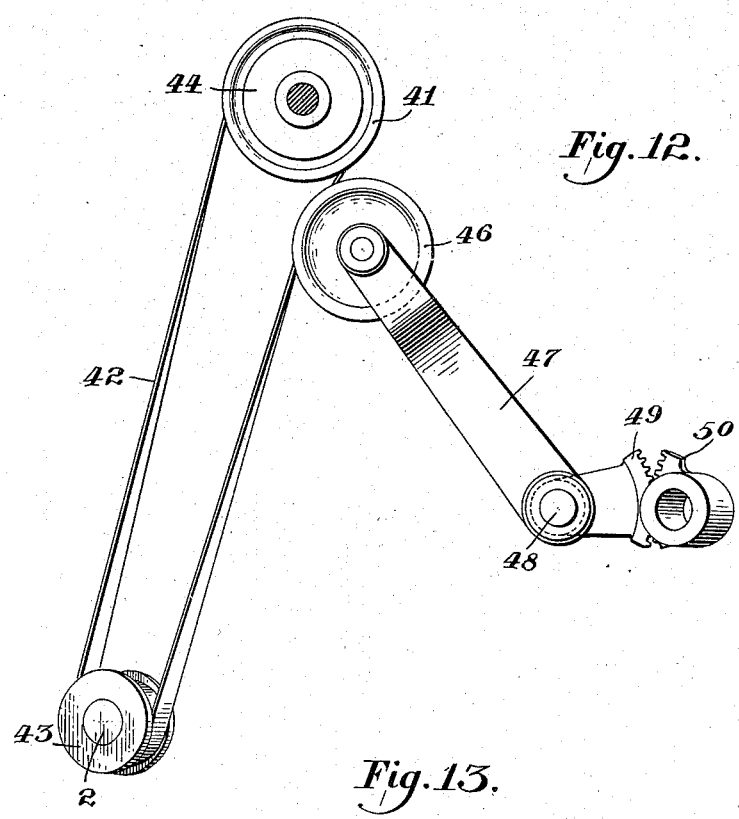
Figure 13:
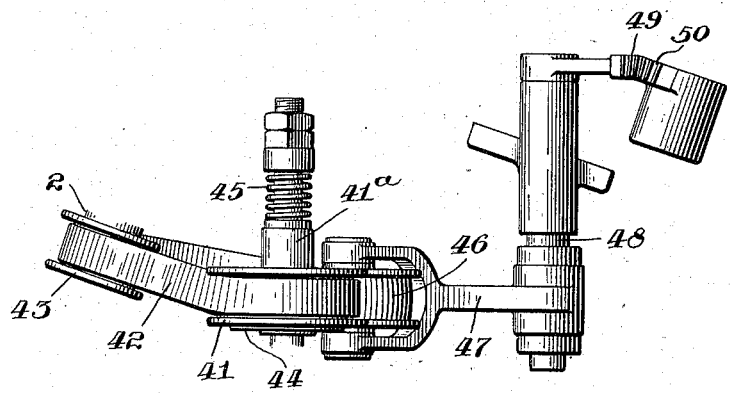
Figure 22:
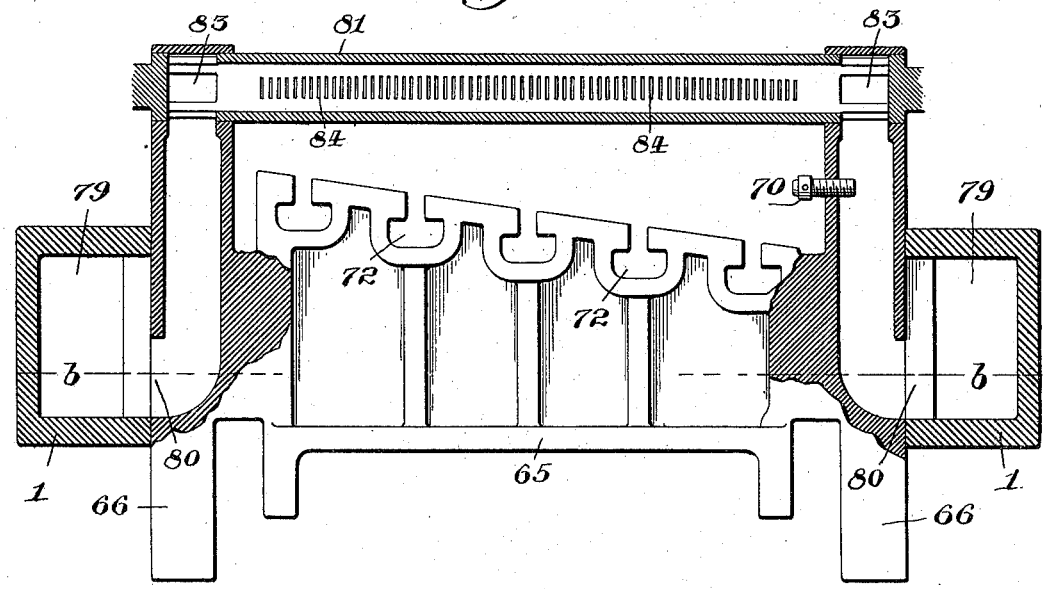
Figure 23:
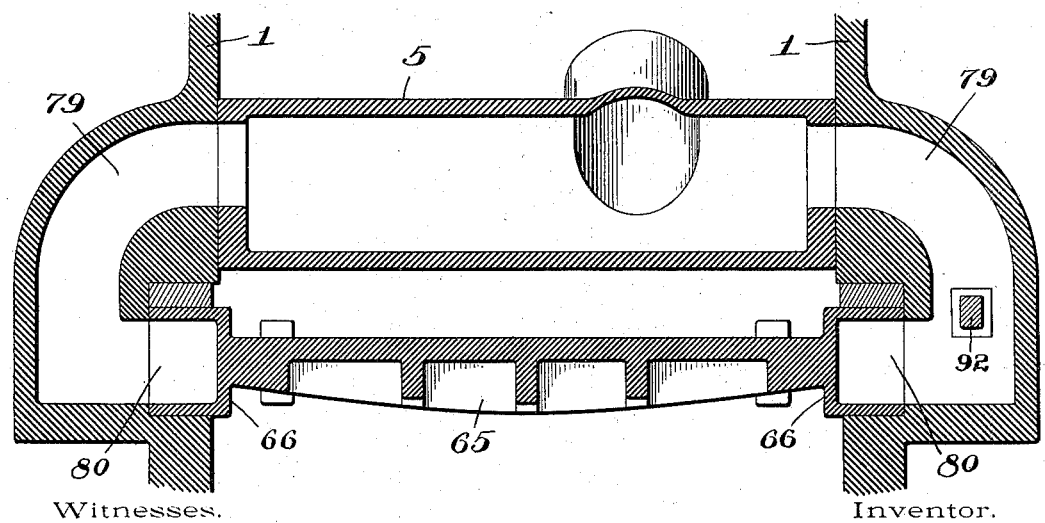
Figure 28:
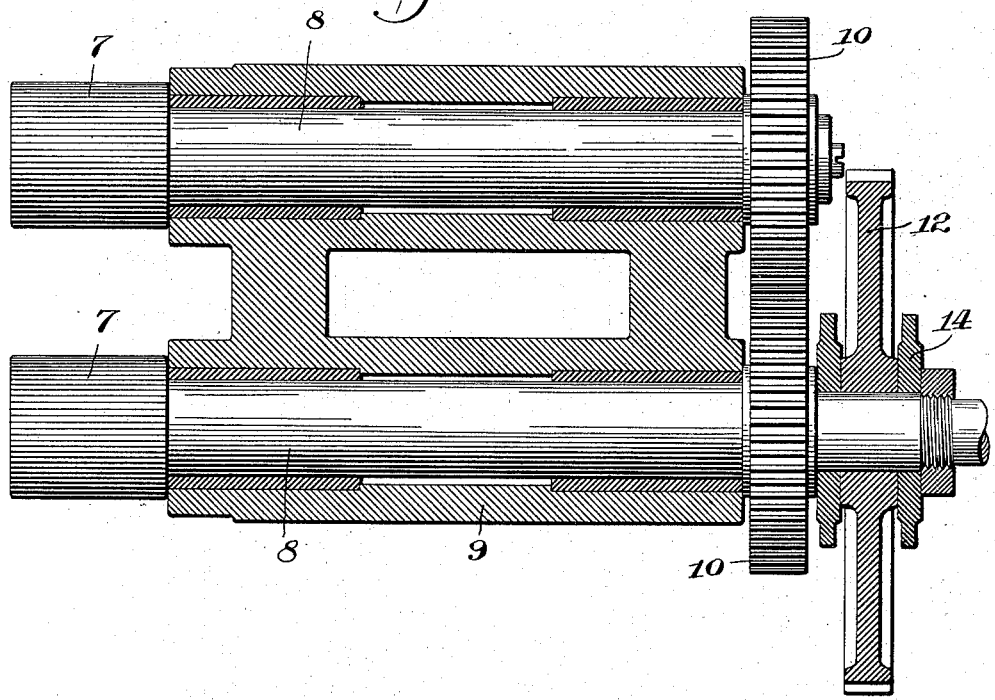
Figure 29:
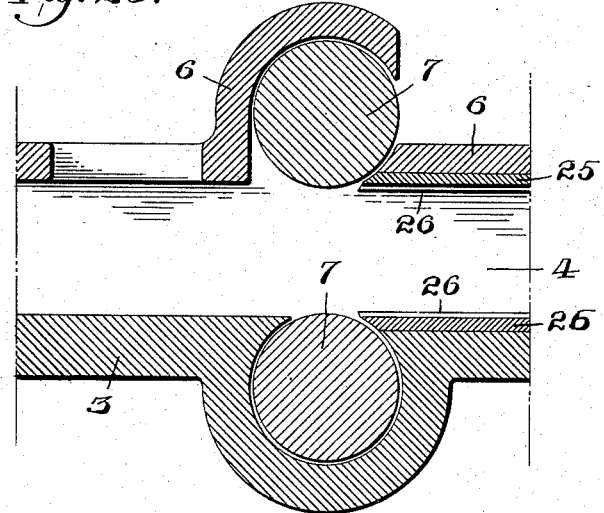
Figure 32:
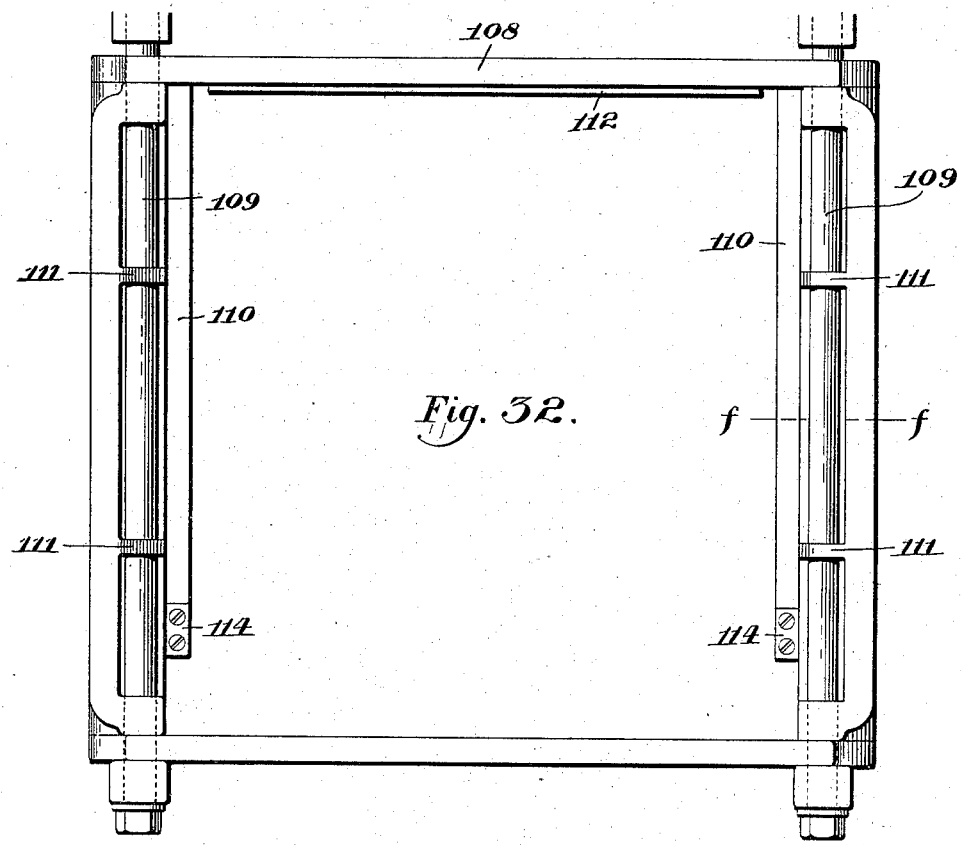
Figure 38:
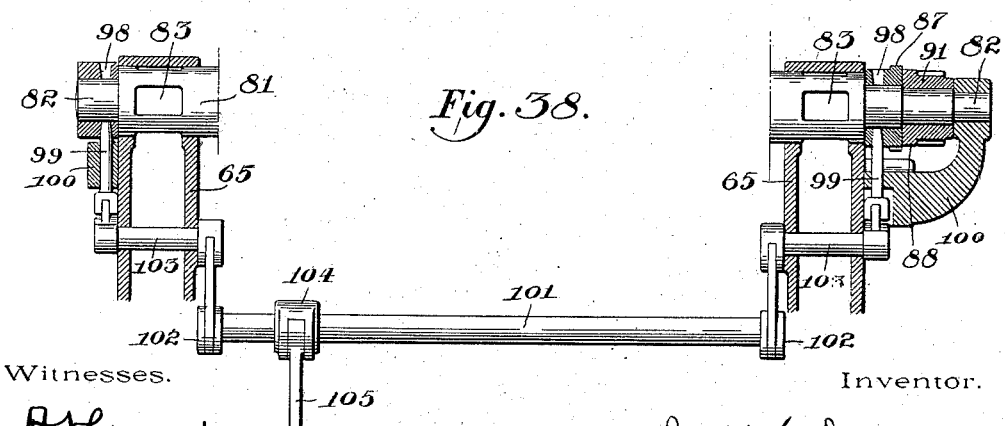
Figure 59:
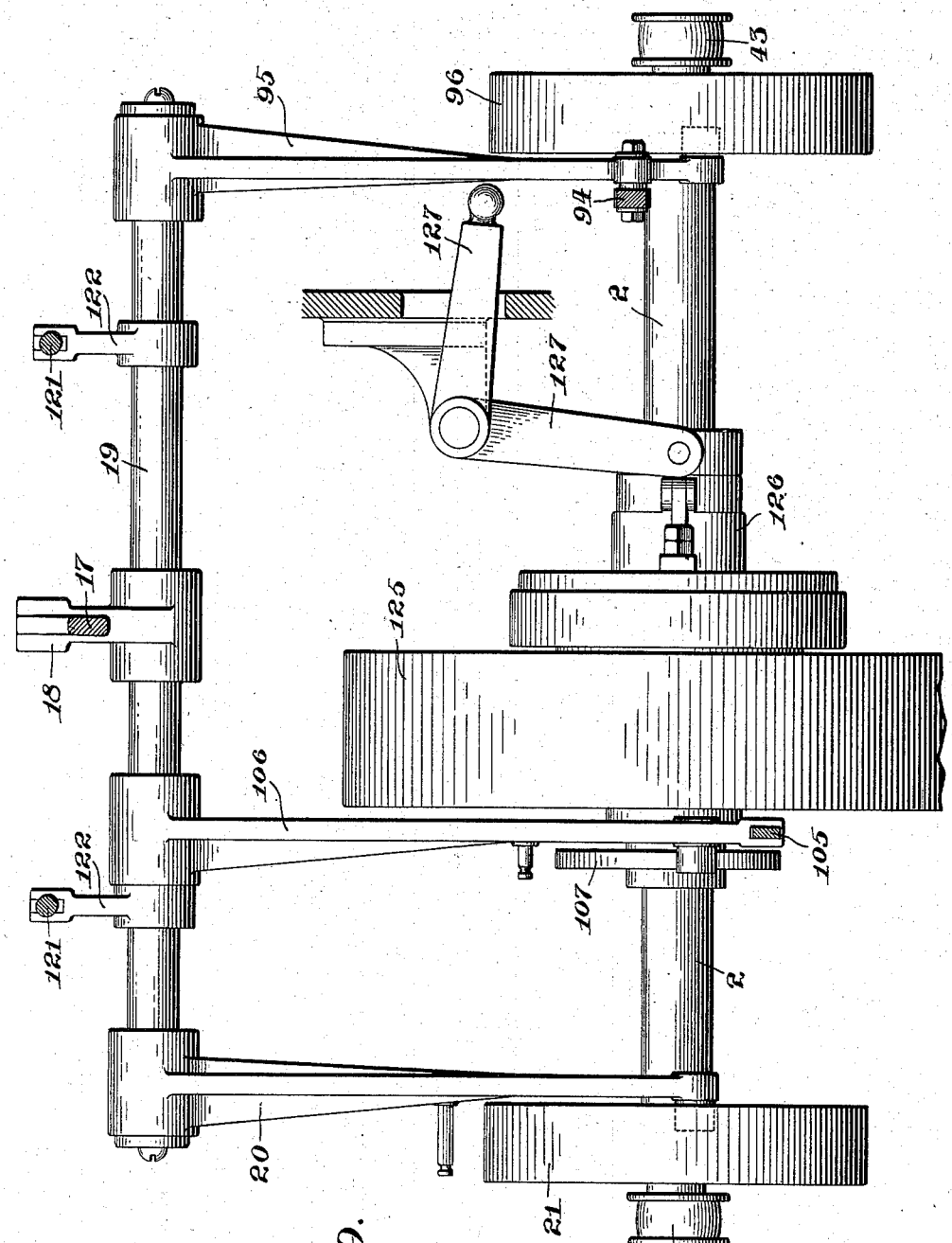

In the annexed drawings, Figure 1 is a longitudinal vertical section of the machine. Fig. 1ᵃ is a plan of the machine with the plate-supply hopper removed and the auxiliary wood-feeding hoppers broken away. Fig. 2 is a partial front view of the machine. Fig. 3 is a view of the left-hand side thereof. Fig. 4 is a view of the right-hand side of the machine, the exhaust-fan therefor being shown in Fig. 4ᵃ. Figs. 5, 6, and 7 are separate views of certain cams hereinafter referred to. Fig. 8 is a plan of the auxiliary wood-feeding hopper. Fig. 9 is a side elevation thereof. Fig. 10 is an end view of the same. Fig. 11 is a sectional detail through the forward end of the hopper, showing the follower and one end of the operating-screw therefor. Fig. 12 is a detail of the screw-driving mechanism. Fig. 13 is a plan thereof. Fig. 14 is a detail of the devices for actuating the tension-rollers of the screw-driving mechanism. Fig. 15 is a plan of the cutter-bar as attached to the reciprocating carrier, a part of the cutter-clamp bar being broken away to show the underlying cutters. Fig. 16 is a sectional detail through the cutter-bar as on the line $a\,a$ of Fig. 15. Fig. 17 is a plan of two of the cutters greatly enlarged. Fig. 18 is a sectional elevation of one of the cutters. Fig. 19 is an elevation of the splint receiving and transferring cylinder and its adjuncts. Fig. 20 is an end view of said cylinder, showing the ratchet-and-pawl mechanism for intermittently rotating the same. Fig. 21 is a vertical section through a portion of the dipping-plate, the transfer-cylinder, the upper portion of the carrier, the cutter-bar thereon, a feed-hopper, and a portion of the underlying exhaust-chamber, the parts being shown in the position they occupy immediately upon the introduction of a row of splints to said plate. Fig. 22 is a sectional elevation of the carrier and the transfer-cylinder, showing the air-exhaust passages from the cylinder to lateral conduits on the main frame, said carrier being represented as in its lowest position. Fig. 23 is a horizontal section as on the line $b\,b$ of Fig. 22. Fig. 24 is a plan of the main exhaust-chamber as detached from the machine. Fig. 25 is a vertical section as on the line $c\,c$ of Fig. 24. Fig. 26 is a plan of the duplex hopper with the cap-plates removed. Fig. 27 is a sectional detail of said hopper as on the line $d\,d$ of Fig. 1. Fig. 28 is a sectional elevation of one set of main feed-rolls and their immediate connections. Fig. 29 is a vertical section through a portion of the main hopper and the feed-rolls therein as on the line $e\,e$ of Fig. 1. Fig. 30 is a detail of the pawl-and-ratchet mechanism for actuating the feed-rolls. Fig. 31 is a detail, in end view, of the lever-and-link connections for operating both pawl-and-ratchet mechanisms simultaneously. Fig. 31ᵃ is a section of the main exhaust-chamber, showing the lever 16 and its fulcrum-stud. Fig. 32 is a plan of the plate-supply hopper. Fig. 33 is a vertical section of said hopper, showing plates therein and one of the feed-pawl devices. Fig. 34 is a similar section of the forward portion of said hopper. Fig. 35 is a section through one of the sides of the hopper as on the line *f f* of Fig. 32. Fig. 36 is a front elevation of the bracket or support upon which the plates are successively delivered from the hopper. Fig. 37 is a side view of said bracket or support. Fig. 38 is a sectional detail of the locking mechanism for the transfer-cylinder above referred to. Fig. 39 is a detail in plan of the main driving mechanism and immediate connections.

The numeral 1 designates a substantial supporting-frame of appropriate shape and size for its intended purpose, and 2 the main driving-shaft, to which motion is imparted from a suitable source of power.

Supported on the upper forward portion of the main frame is a frame 3, in which are formed two converging chambers, by way of which the wood is fed to the cutters. The frame 3 thus constitutes a duplex hopper. It comprises a channeled base 4, that is bolted to an underlying air-chamber 5, (hereinafter described,) fixed between the sides of the main frame, the rear walls of the chambers converging at a point midway of the sides of the main frame and the inner or discharging ends of the chambers terminating in a common transverse line or edge that intersects the apex of the said walls, whereby the wood discharged from each of the chambers will be fed similarly upon such line or edge, so as to present the maximum amount of material thereto for a purpose below explained. The hoppers are covered by cap-plates 6, which are bolted to the base portion.

Within each of the hoppers, near the discharging ends thereof, are feed-rolls 7, preferably milled, by means of which the wood is periodically fed forward. In the present instance there are two rolls in each hopper, the same being formed on shafts 8, that extend inwardly at right angles to the hopper, or substantially so. The shafts of the rolls in the respective hoppers thus converge toward the median line of the machine. These shafts are mounted in boxes 9, that are supported upon and bolted to the top of the air-chamber 5, above referred to, and the shafts of each set of rolls are provided with coacting gears 10, whereby the rolls may be driven in concert. Each of the lower shafts is extended rearwardly and journaled in a box 11 on a cross-bar of the main frame, such extension having affixed thereto a ratchet-wheel 12, with which engages a suitable actuating-pawl 13. This pawl is pivoted to the outer arm of a rock-frame 14, that is mounted on the extension, to the end that when said frame is oscillated the ratchet-wheel and, perforce, the shafts and the feed-rollers are intermittently rotated. The inner arms of the respective rock-frames are connected by means of links 15 with one arm of a bell-crank lever 16, which is fulcrumed to a stud 16$^a$, mounted in a lug 16$^b$ on the wall of the air-chamber 5. The other arm of this lever is connected by means of a link 17 with a crank-arm 18 on a rock-shaft 19, which has its bearings in the side walls of the main frame, said shaft having affixed thereto an arm 20, which rests upon and is actuated by an appropriate cam 21 on the main driving-shaft. The arm 20 is held normally in engagement with the cam by means of a suitably-disposed spring 20$^a$, one end of which is secured to the arm and the other end to the main frame. (See Fig. 3.) By this construction the feed-rolls are simultaneously operated, the contour of the cam, Fig. 5, determining their periodical actions in harmony with the other coacting mechanisms hereinafter described.

Within each of the hoppers there are located in rear of the feed-rolls spring-actuated plates 22, which are adapted to bear against blocks of wood of different thickness and thus force them against the back or feed line of the hopper. In the present instance these plates are fixed to vertically-disposed studs adjacent to the forward wall of the hopper, the upper ends of the studs extending through the cap-plate and being provided with arms 23, that are connected by spiral springs 24, the tendency of which is to force the arms toward the center of the hopper.

Let into the top and bottom of each of the hoppers, immediately in advance of the feed-rolls, are plates 25, which are provided with longitudinal guide-ribs 26, into which the opposed surfaces of the block are forced by the feed-rolls, such ribs thereby guiding and steadying the blocks as they are presented to the cutters below described.

Extending outwardly from each of the hoppers is an auxiliary hopper 27, which is adapted to receive the wood and to feed it into the main hopper and into the bite of the feed-rolls. This auxiliary hopper comprises a trough, one end of which is bolted to the end of the main hopper while the other or outer end is supported upon a suitable pedestal, such auxiliary hopper thus communicating with the main hopper and being in effect a continuation thereof.

The bottom of the trough extends below the main hopper, so as to form a chamber for the reception of a screw 28, that extends the entire length of the trough and has its bearings in the respective ends of the latter. Arranged within the trough is a follower 29, which is operatively engaged with the screw, whereby when the screw is turned the follower is impelled forwardly within the trough. On the side walls of the trough are ledges 30, which are on the same horizontal plane as the floor of the main hopper, which ledges are designed to sustain the blocks of wood within the auxiliary hopper. Hence the follower in its movement advances such blocks toward the main hopper.

The follower herein shown is of the following construction: 31 is a slide that is fitted to longitudinal guideways in the side walls of the trough. Pivoted to this slide, near the forward upper corner thereof, is a head 32, on the lower end of which is a segmental nut 33, that normally engages the screw. Extending through the upper portion of the head is a stem 34, on the forward end of which is a transverse plate 35, that rests upon the lateral ledges in the trough, and on the rear end of which stem is an arm 36, provided with lugs 37, that extend over upon the respective sides of the trough. Pivoted to the upper part of the head is a hand-lever 38, which is suitably connected by means of links with the stem. A spring 39, encircling the stem, tends to maintain the latter and, perforce, the plate normally advanced. The nut being engaged with the screw, the follower is bodily advanced thereby, as above mentioned, thus effecting the feeding forward of the wood. When the follower reaches the inner end of the trough, the lugs 37 abut against suitably-disposed studs 40 on the latter, thereby checking the progress of the follower, in which event the motion of the screw is temporarily arrested by means hereinafter described. To retract the follower to the outer end of the trough, the nut is disengaged from the screw and the follower drawn back. This is effected by forcibly grasping the hand-lever 38 and a handle extension on the head, the stem thus being retracted against the action of the spring so as to withdraw the plate from the wood and permit the head to be swung upward on its pivot.

On the projecting end of each of the screw-shafts is a pulley 41, which is geared by means of a belt 42 with a pulley 43 on the main driving-shaft. The pulley 41 has a frictional connection with the screw-shaft, so that when the advance of the follower is checked, as above described, the resistance will overcome the frictional connection, and, in consequence, the pulley 41 will turn idly on the shaft. In the present instance the connection comprises a friction-head 44, affixed to the screw-shaft, the pulley 41 being mounted on a sleeve 41ª on said shaft and being pressed normally into engagement with the head by means of a suitably-disposed spring 45. Other means to this end may be provided.

Mounted in close relation to each of the belts 42 is a tension-roller 46, which is so constructed and arranged that it may be engaged with or retracted from the belt. When the roller is in its normal position, it is engaged with the belt, and the latter is operatively driven by the pulley on the main shaft; but when the roller is retracted from the belt and the tension is thus removed the belt is idle, and, in consequence, the screw-shaft is quiescent. Hence by operating the tension-roller the action of the screw may be arrested at any stage of the operation of feeding the wood in the auxiliary hopper.

The rollers for the respective belts are mounted on arms 47, that are affixed to rock-studs 48, supported in bearings on the respective sides of the main frame. Fast on these studs are toothed sectors 49, which are engaged by corresponding sectors 50 on a common transverse shaft 51, which shaft is provided with a hand-lever 52, whereby it may be operated to effect, through the coöperation of the sectors, the retraction of the tension-rollers from the respective belts. Secured to the lever, immediately above the shaft, is one end of a spiral spring 53, the other end thereof being attached to the main frame, to the end that when the lever is thrown rearward or forward, as the case may be, the spring, passing the center of the shaft, maintains the lever in either position.

Simultaneously with the stopping of the auxiliary feed mechanisms the feed mechanisms in the main hoppers are arrested. This is attained by the provision of a rock-arm 54, adjacent to the cam-actuated arm 20 of the main feed, which arm is connected, by means of a link 55, with the hand-lever 52, and is provided with a stud 56, that is adapted to be swung under a lug 57 on the under side of the arm, and thus maintain the latter out of action with its cam; that is to say, when the hand-lever is thrown forward the arm is swung forward until the stud thereon abuts against the opposed edge of the lug, which latter arrests the movement of the lever until the arm is raised to the highest point by the cam, whereupon the lever, upon being moved farther forward, throws the stud under the lug on the arm, and the latter is thus held above the path of the cam.

Reciprocative vertically in a plane intersecting the discharging portion of the hoppers is a series of cutters 58, which are constructed and arranged to sever splints from the opposed ends of the blocks in the respective hoppers as the blocks are projected, and then to introduce the splints thus cut to a transfer mechanism, which in turn punches the splints into dipping plates or holders, as hereinafter more fully described.

The cutters herein shown comprise tubular heads 59 of novel construction provided with shanks 60, that are snugly fitted to parallel ways in the edge of the cutter-bar 61, and are clamped upon the latter by means of a superposed clamp-bar 62. The bar 62 is preferably made in sections, which are screwed or otherwise secured to the cutter-bar. The "clamp-bar," as I have termed it, is provided on its under side with a longitudinal tongue or rib 63, that registers with a corresponding groove or way in the cutter-bar, such groove or way being immediately rearward of the series of cutter-ways. The shanks of the cutters are beveled on their upper edges, the lower forward edge of the clamp-bar being correspondingly beveled to receive the shanks, to the end that when the clamp-bar is applied the cutters are drawn thereby uniformly into line against the tongue 63 and fixedly held in alinement. (See Figs. 15 to 18, inclusive, and Fig. 21.) When the cutters are thus set, the tubular or working heads thereof are in the same vertical plane as the projecting ends of the blocks in the respective hoppers, so that in the descent of the cutters the heads will pass down into the wood and sever match-splints therefrom, which cutters in their succeeding ascent will carry the splints upward above the blocks. The lower or cutting edge of each of the heads is beveled to secure a clean cutting action, the under portion of the shank, adjacent to the cutting edge, having therein, concentric with the tube, a beveled groove 64, which is designed to prevent the jamming of the wood should a tube be broken during the operation of the machine, the edge of the groove in that case shaving off any excess of wood that might be forced against it.

It will be observed that the lower edge of the head is beveled on the inside, as well as on the outside, to the end that the splint cut from the block will be of larger diameter than the upper portion of the head, and will be thereby compressed and held rigidly in place.

The cutter-bar is mounted upon a vertically-reciprocative carrier 65, which is provided with lateral guides 66, fitted to ways in the main frame, said carrier being actuated from the main driving-shaft by means of eccentrics 67, with which it is connected by eccentric-rods 68. The top of the carrier is beveled or inclined, and there is interposed between such beveled portion and the cutter-bar a correspondingly-beveled block 69, which constitutes, in effect, a sliding wedge, by the longitudinal movement of which the cutter-bar and its cutters may be adjusted vertically in a horizontal plane. Fitted to one of the guides 66 is a set-screw 70, which bears against the larger end of the wedge, so that by properly manipulating the screw the wedge may be moved inward to effect nice adjustment of the parts. The cutter-bar is held fixedly in its positions of adjustment by means of depending screws 71, the heads of which are fitted to recesses 72 in the carrier. The wedge is provided with vertical channels to permit the free passage of the screws.

The cutter-bar is detachably held in and between the lateral guides of the carrier by means of lock-screws 73, which are fitted to the said guides, adjacent to the ends of the bar, in such manner that the screw-heads, which are each cut away on one side, may be turned against or away from the end flanges on the forward corners of the bar. (See Fig. 15.)

The lower forward edge of the duplex hopper has secured thereto, in the path of the cutter-heads, a metallic cutter-strip 74, upon which are preferably formed projections 75, that register with the cutter-tubes, so as to effect a clean cutting of the splints from the lower end of the block. The front edge or face of the strip is beveled or inclined, as at 76, to form, in conjunction with an opposing projecting portion 76$^a$ on the bar 61, a cutting factor, should a cutter-head be broken, and also to secure clearance for the waste material from the blocks of wood. (See Fig. 21.)

Between the duplex hopper and the carrier is formed a space or conduit 77, into which the waste material is discharged, the opposed face of the carrier being covered by a plate 78. The lower portion of the space or conduit communicates directly with the exhaust-chamber 5, above referred to, which chamber is connected, by means of a pipe 5$^a$, with a fan or exhaust-engine, Fig. 4$^a$, which exhausts the air from the chamber and effects, among other things hereinafter specifically named, the final and effective discharge of the waste material.

The ends of the exhaust-chamber 5 communicate directly with and virtually form a part of pockets or conduits 79 on the respective sides of the main frame, which pockets or conduits open into the guideways for the reciprocative carrier.

The side guides 66, which work in these ways, are hollow or tubular at and above the lateral conduits, and have communication with the latter by openings 80, the relation of the parts being such that the communication thus had is unaffected during the reciprocation of the carrier, for a purpose directly explained.

Mounted in bearings in the hollow side guides of the carrier, immediately above the cutter-bar and parallel therewith, is a rotatable hollow cylinder 81, the ends of which are headed and provided with axial studs or trunnions 82. The cylinder is provided at its ends with peripheral openings 83, that communicate with the hollow guides, so that, through the connections described, the air will be continually exhausted from the cylinder. In the cylinder are two series of circumferential openings 84, that communicate with the interior of the cylinder, the two series being diametrically opposite to each other. The openings in each series are formed at right angles to the axial line of the cylinder, and the disposition of the cylinder is such that when the cylinder is in one position the openings occupy a vertical position, one set thereof being directly above and in line with the underlying cutters, and when the cylinder is turned a half-revolution the other openings occupy a corresponding position in respect to the cutters.

By the above construction it will be obvious that when the carrier is lowered to effect the cutting of the splints, as previously described, the cylinder will be lowered therewith, and that since the vertically-disposed slots in the cylinder are in alinement with the cutters the slots in their descent will embrace the individual splints. Hence when the carrier is raised the lower ends of the splints will be held in the cutters and the upper ends thereof will lie in the slots, the air as it is exhausted from the cylinder in the manner explained thus tending to draw the ends forcibly into the slots. In the succeeding descent of the carrier, the position of the cylinder relative to the cutters being unchanged, and the blocks in the hoppers having been advanced by the feed-rolls, the cutters strike the blocks to cut another row of splints therefrom, the ends of the previously-cut splints thus being thrust from the cutters and the cylinder being turned a half-revolution in the direction indicated by the arrow in Fig. 21, so as to bring the second series of slots into position to receive the succeeding row of splints in like manner. When the splints are released from the cutters, they are held against the cylinder by suction, and are therefore turned by and upon the cylinder. The sides of the slots in the path traversed by the splints are extended so as to form bearing-surfaces 85 for the splints, the upper ends of which latter as they are thrust from the cutters extending against or adjacent to a longitudinal abutment or thrust-bar 86 on the cylinder. This bar, when the cylinder and splints are turned as above stated and the carrier is moved upward, bears against the opposed ends of the splints and thrusts their upper or free ends into engagement with a superposed plate or holder such as hereinafter described. The plate is advanced step by step so as to receive the succeeding rows of splints which are similarly brought forward by the cylinder and forced upward thereby, it being understood that there is a properly-disposed abutment-bar for each series of slots.

I preferably, though not essentially, gradually reduce the openings of each series from the central opening to the end openings, so that as the air is exhausted from the ends of the cylinder a uniform suction upon the several splints will be effected.

Although any appropriate mechanism may be employed for turning the cylinder and locking it temporarily in its successive positions relatively to the cutters, I have shown to this end simple and efficient means which I shall proceed to describe, reference being had more particularly to Figs. 1, 2, 4, 6, 19, 20, and 38 of the drawings.

On one end of the cylinder or to the projecting head thereof is fixed a ratchet-wheel 87, having two oppositely-disposed teeth, and adjacent to this wheel is loosely mounted a sleeve 88, provided with a projecting arm 89, carrying a pawl 90, that coacts with the teeth of the ratchet-wheel. Formed on or secured to the sleeve is a pinion 91, with which engages a vertically-arranged rack 92, which is guided in boxes 93 in the top and bottom walls of the conduit 79. The lower end of the rack is connected by means of a link 94 with a rock-arm 95, one end of which is loosely mounted on the shaft 19, while the other or free end engages a face-cam 96, Fig. 6, on the main driving-shaft, such cam thus controlling the operation of the rack. The construction of the parts is such that when the carrier is in the extreme upward position preparatory to its descent to release the splints from the cutters, as above stated, the pawl lies slightly forward of the opposed tooth of the ratchet-wheel, as seen in Fig. 20. When the splints have been released from the cutters, the pawl is in engagement with the tooth, and as the carrier continues its descent, the pinion and pawl being turned through the medium of the rack, the ratchet-wheel and, perforce, the cylinder with its complement of splints are turned a half-revolution. During the continued descent of the carrier and its appurtenances the cylinder is locked against rotary movement, the rack during such movement being lowered through the contour of the cam at the same speed, relatively, as the descent of the pinion. The rack and pinion are correspondingly operated in concert during the succeeding ascent of the cylinder, and in the next following descent of the parts the pawl is similarly actuated in respect to the second tooth on the ratchet-wheel, the cylinder is locked in position, and a repetition of the previously-described operation is effected.

In the hub of the ratchet-wheel 87, and also in a collar 97, which is affixed to the stud or trunnion on the opposite head of the cylinder, are two diametrically opposite holes 98, with which are adapted to be engaged at predetermined intervals vertically-reciprocative bolts 99, fitted to brackets 100 on the respective sides of the carriage. Journaled in bearings in the carrier is a rock-shaft 101, on the respective ends of which are crank-arms 102, that are linked with the longer arms of levers 103, fulcrumed on the sides of the carriage, the shorter arms of the levers being connected with the bolts, respectively. On the body of the rock-shaft is a crank-arm 104, which is connected by means of a link 105 with a rock-arm 106, one end of which is loosely mounted on the shaft 19, and the other or free end rides upon an appropriate cam 107. The arm 106 is held yieldingly upon the cam by means of a stout spring $107^a$, one end of which is secured to the arm and the other end to the main frame. The contour of the cam (see Fig. 7) is such that when the cylinder has been set in respect to the cutters as hereinbefore stated the rock-shaft is turned to effect, through the intermediate connections, the projection of the bolts into the opposed openings or recesses in the respective ends of the cylinder, thus locking the latter in place, and that, preparatory to the partial rotation of the cylinder, the rock-shaft is turned to retract the bolts and thus free the cylinder.

Referring to the rack mechanism into which the splints are projected row by row from the cylinder, as above mentioned, 108 designates a rectangular hopper, which is secured to the top of the main frame by means of tie-rods 109. This hopper is open at top and bottom, its sides being provided on their lower inner edges with horizontal flanges 110, and at intervals apart above said flanges with vertically-disposed tapering ribs 111. The flanges are foreshortened at the forward end of the hopper, such end being reduced or cut away to the thickness of a plate above the upper surfaces of the flanges, or substantially so, for a purpose below explained. In the inner side of the rear wall of the hopper is secured a strip 112, which forms a ledge slightly above the plane of the flanges. The plates 113 are piled in the hopper one upon another, the rear end of the lowermost plate resting upon the ledge 112 and the forward portion thereof bearing upon the underlying ends of the flanges, such ends being preferably reinforced by tapering pieces 114, of hardened steel, let into the same. The rack-plates are each provided with parallel rows of holes for the reception of the splints, each plate being provided on its under side near its respective lateral edges with longitudinal racks 115, whose teeth are equal in number and position to the rows of holes in the plate.

Engaging the teeth of the respective racks on the lowermost plate are pawls 116, the arms of which are fixed to studs 117, mounted in bearings in the respective sides of the main frame just forward of the hopper, whereby when the said studs are oscillated the engaged plate is moved forward step by step to present a row of holes to each succeeding row of splints in the transfer-cylinder, the plate thus being withdrawn through the reduced forward end of the hopper. As this end is immediately above the acting thrust-bar in the underlying transfer-cylinder, such end performs the function of a "backer" to sustain the plate during the introduction of the splints thereto.

In the first step of the plate it is disengaged from the ledge, so as to bear throughout the length of the lateral supporting-flanges in the hopper, the contiguous plate thus resting upon the ledge. Owing to the pieces 114 on the forward ends of the flanges being beveled on their upper faces, as shown, the plate drops squarely upon the same instead of upon the corners of such pieces, and hence the otherwise liability of breaking the corners by the impact of the plate is obviated.

By the foregoing construction of the plate-supply hopper the lowermost plate during its forward movement is relieved materially from the great weight of the superposed plates, since the latter only bear upon the forward portion of the bottom plate. Inasmuch as the plates rest more or less upon the ribs in the hopper the weight upon the bottom plate is also thereby considerably reduced. Besides these ribs obviate all liability of the plates binding against the walls of the hopper, and at the same time insure the proper position of the lowermost plate in respect to the pawls and the underlying transfer-cylinder.

In the present instance the studs 117 are provided on their outer ends with arms 118, that are connected by links 119 with rearwardly-arranged levers 120, that are in turn connected by means of links 121 with arms 122, fixed on the rock-shaft 19, hereinbefore described, whereby during the operation of the shaft the pawls 116 are periodically actuated.

Secured to the respective sides of the framework just forward of the plate-supply hopper 108 is a bracket 123, which is provided with suitably-disposed ledges 124, upon which the respective edges of the plates are supported as they are ejected from the hopper. The succeeding plates with their complements of splints are removed from the bracket manually or automatically, as desired.

Although any suitable mechanism may be employed for throwing the machine into and out of operation, as desired, yet I prefer to mount the driving-pulley 125 loosely upon the main shaft 2 and provide an appropriate clutch 126, whereby it may be made fast or loose as required. As the clutch herein shown is a toggle-clutch of usual and well-known construction no particular description thereof is necessary. It is connected with one arm of a bell-crank lever 127, that is fulcrumed to a bracket on the inner side of the main frame, the other arm of the lever projecting through a slot in the side of the frame and being connected by means of a link 128 with the shorter arm of a suitable hand-lever 129, whereby the clutch may be readily thrown into and out of gear with the driving-pulley. Mounted below the cam 96, which is fixed to the main shaft, is a brake-lever 130, one arm of which carries a brake-shoe 131, while the other arm is provided with a cam-surface 132. Bearing upon this surface is a roller 133 on the lower arm of a lever 134, that is fulcrumed on the side of the main frame, the other arm of the lever being pivotally connected with the link 128, and the several parts being so constructed and relatively arranged that when the hand-lever is operated to retract the clutch from the pulley the lever 134 bears upon the cam-surface of the brake-lever and forces the brake-shoe thereof against the periphery of the cam 96, thereby insuring the rapid and effectual stopping of the entire mechanism.

Secured to the lever 134, directly above its fulcrum, is one end of a spiral spring 135, the other end thereof being attached to the main frame, to the end that when the lever is thrown forward to disengage the clutch and apply the brake, or is moved rearward to engage the clutch and release the brake, as occasion may require, the spring passing the center of the fulcrum maintains the lever in either predetermined position.

I claim as my invention—

1. In a match-making machine, the combination, with splint-cutting mechanism, of two converging feed-hoppers, the bottoms of which are on the same horizontal plane and the inner or discharging ends of which terminate in a common transverse line or edge in the path of the splint-cutting mechanism, whereby there is cut simultaneously from separate blocks of wood a row of uniformly-separated splints, substantially as described.

2. In a match-making machine, the combination, with splint-cutting mechanism, of two feed-hoppers, the rear walls of which converge centrally of the cutting mechanism and the inner or discharging ends of the two hoppers terminate in a common transverse line or edge that intersects the apex of said walls, substantially as described.

3. In a match-making machine, the combination, with a feed-hopper, of feed mechanism therein, and automatically-yielding plates in rear of said mechanism pivotal studs for said plates, opposite arms on the studs of the successive plates, and springs connecting the arms successively, whereby the plates bear against blocks of different thickness and force them against the back or feed-line of the hopper, substantially as described.

4. In a match-making machine, the combination, with a feed-hopper provided with guide-ribs therein, of a feed mechanism in rear of said ribs, and automatically-yielding presser-plates in rear of said mechanism, pivotal studs for said plates, opposite arms on the studs of the successive plates, and springs connecting the arms successively, substantially as described.

5. In a match-making machine, the combination, with splint-cutting mechanism, of two feed-hoppers converging toward the same, the bottoms of which hoppers are on the same horizontal plane and the inner or discharging ends of which terminate in a common transverse line or edge in the path of the splint-cutting mechanism, feed mechanisms in said hoppers, respectively, and means for simultaneously actuating said feed mechanisms, whereby there is cut simultaneously from separate blocks of wood a row of uniformly-separated splints, substantially as described.

6. In a match-making machine, the combination, with splint-cutting mechanism, of two feed-hoppers converging toward the same, the bottoms of which hoppers are on the same horizontal plane and the inner or discharging ends of which terminate in a common transverse line or edge in the path of the splint-cutting mechanism, feed-rolls in the respective hoppers, the shafts of said rolls converging toward the median line of the machine, and means for simultaneously actuating said shafts, substantially as described.

7. In a match-making machine, the combination, with splint-cutting mechanism, of two feed-hoppers converging toward the same, the bottoms of which hoppers are on the same horizontal plane and the inner or discharging ends of which terminate in a common transverse line or edge in the path of the splint-cutting mechanism, feed-rolls in the respective hoppers, the shafts of said rolls converging toward the median line of the machine, coacting gearing on the shafts of each set of rolls, pawl-and-ratchet mechanism for actuating said shafts, a driving-shaft, a cam thereon, and operative connections between said cam and the pawl-and-ratchet mechanism, substantially as described.

8. In a match-making machine, the combination, with the auxiliary hopper, of a longitudinal screw-shaft therein, means for operating said shaft, and a follower in said hopper comprising a slide guided in the hopper, head pivoted thereto provided with a segmental nut which engages the screw-shaft, a bearing-plate on said follower having independent movement longitudinally of the follower, and means for independently moving said plate, substantially as described.

9. In a match-making machine, the combination, with an auxiliary hopper, of a longitudinal screw-shaft therein, means for operating said shaft, and a follower in said hopper comprising a slide guided in the hopper, a head pivoted thereto provided with a segmental nut which engages the screw-shaft, a stem extending through the upper portion of the head, a plate on said stem, a spring tending to maintain the stem and plate normally advanced, and means for retracting said stem and plate against the action of the spring, substantially as described.

10. In a match-making machine, the combination, with an auxiliary hopper, provided with a stop near the forward or discharging end thereof, a longitudinal screw-shaft in said hopper, a friction-pulley on said shaft, a driving-shaft, a pulley on said shaft, a belt connecting said pulleys, a belt tension-roller, and its supporting and operating parts, of a follower in said hopper comprising a slide, a head pivoted thereto provided with a segmental nut which engages the screw-shaft, a bearing-plate on the forward end of the head, means whereby said plate is longitudinally movable in respect to, and independently of, the head, and stops on the follower adapted to abut against the stops first named, substantially as described.

11. In a match-making machine, the auxiliary hopper, a follower therein, a shaft for actuating said follower, a frictional pulley on said shaft, a driving-shaft, a pulley on said shaft, a belt connecting said pulleys, a belt tension-roller, an arm supporting said roller, a rock-stud for said arm, a toothed sector on said stud, a sector coacting therewith, a shaft for said latter sector, and means for operating said latter shaft, substantially as described.

12. In a match-making machine, the combination, with splint-cutting mechanism the converging main hoppers, the bottoms of which are on the same horizontal plane and the inner or discharging ends of which terminate in a common transverse line in the path of the splint-cutting mechanism, the feed mechanisms in said hoppers, and means for simultaneously operating said mechanisms, of auxiliary hoppers, auxiliary feed mechanisms therein, means for actuating said last-named feed mechanisms simultaneously, and means for automatically rendering the same inactive independently of the first-named feed mechanisms, substantially as described.

13. In a match-making machine, the combination of a main feed-hopper, feed mechanism therein, a main driving-shaft, operative connections between said shaft and feed mechanism, an auxiliary feed-hopper communicating with the main hopper, feed mechanism in said auxiliary feed-hopper communicating with the main hopper, and means for arresting said latter feed mechanism and thereby automatically throwing the said connections out of operative position, substantially as described.

14. In a match-making machine, the combination, with a main feed-hopper, feed mechanism therein, a main driving-shaft, a cam thereon, connections between said cam and feed mechanism, of an auxiliary feed-hopper communicating with the main hopper, feed mechanism in said auxiliary hopper, and means for simultaneously arresting said last-named feed mechanism and moving the said connections above the path of the cam, substantially as described.

15. In a match-making machine, the combination, with a cutter-bar, of cutters thereon provided with shanks having their upper surfaces beveled downward in respect to the forward end of the shanks and a clamp-bar beveled coincidentally with said shanks, superposed on the latter, and secured to the cutter-bar, together with a tongue or rib against which the ends of the cutter-shanks are drawn when the clamp-bar is applied, substantially as described.

16. In a match-making machine, the combination, with a cutter-bar provided with a longitudinal groove or way therein, and with transverse interspaces communicating with said way, of cutters provided with shanks having their upper surfaces beveled downward in respect to the forward ends of the shanks, which shanks are fitted to said interspaces, and a clamp-bar provided with a longitudinal tongue or rib that registers with said groove or way, and with a beveled portion that is superposed on the shanks, whereby the cutters are drawn uniformly into line against said tongue or rib and fixedly held in alinement, substantially as described.

17. In a machine for making matches, the combination, with a cutter-bar, of cutters thereon provided with shanks, having their upper surfaces beveled downward in respect to the forward ends of the shanks, and a superposed clamp constructed to engage said beveled surfaces, whereby said shanks are clamped on the bar and drawn up into alinement, substantially as described.

18. In a match-making machine, the combination, with a cutter-bar, of cutters thereon provided with shanks which are rearwardly enlarged so as to be wedge-shaped in vertical longitudinal section, and a bar imposed on said shanks and adapted to draw them into alinement and clamp them fixedly therein, substantially as described.

19. In a match-making machine, the combination, with a reciprocative carrier having its upper edge beveled or inclined, of a longitudinally-movable wedge having a correspondingly-beveled face imposed upon said edge, a cutter-supporting bar imposed on the upper or horizontal face of said wedge, and means for guiding the bar vertically during the longitudinal movement of the wedge, together with a splint-receiving device mounted above the cutter-supporting bar, substantially as described.

20. In a match-making machine, the combination, of a reciprocating cutter-head carrying a line of cutters, means for feeding stock to said cutters whereby a row of splints is produced, a transfer device mounted above the cutters in said head and adapted to receive the successive rows of splints from the cutters, means for actuating said device independently of the cutter-head, and a splint-receiving plate adjacent to said device and adapted to receive the splints therefrom, substantially as described.

21. In a match-making machine, the combination of a reciprocating cutter-head carrying a line of cutters, means for feeding stock to said cutters whereby a row of splints is produced, a hollow transfer device mounted above said head, means for exhausting air from said device to the end that the row of splints will be drawn thereto by suction, and means whereby said splints are thrust from the said device into a splint-receiving plate, substantially as described.

22. In a match-making machine, the combination of a reciprocating cutter-head, a transfer device mounted thereon, having provisions for receiving and retaining the splints independently of the cutter-head, means for moving said device independently of the cutter-head, and a splint-receiving plate or holder adjacent to said device substantially as described.

23. In a match-making machine, the combination of a reciprocating cutter-head, a transfer device mounted thereon, having provisions for receiving and retaining the splints independently of the cutter-head, an abutment coacting with said transfer device, means for moving said device independently of the cutter-head, and a splint-receiving plate or holder adjacent to said device, substantially as described.

24. In a match-making machine, the combination of a reciprocating head, a rotatable cylinder mounted thereon, said cylinder having provisions for receiving and retaining the splints as they are cut, an abutment or thrust-bar on the cylinder, a splint-receiving plate or holder adjacent to the cylinder, and means for rotating said cylinder, substantially as described.

25. The combination, with a source of splint supply from which the splints are endwise delivered, of a perforated splint-receiving plate, a chambered structure arranged in proximity to and independently of said plate, and means for inducing a current of air in said structure, said structure being constructed to receive and retain the lateral ends of a row of splints at intervals apart, and means whereby the projecting opposite extremities of said splints are engaged with said plate, substantially as described.

26. The combination, with a source of splint supply from which the splints are endwise directed, of a splint-receiving device adjacent thereto, means whereby a current of air is induced to effect the engagement of the lateral ends of the splints with said device at intervals apart, a splint-receiving plate adjacent to, and movable independently of, said device, and means whereby the projecting opposite extremities of said splints are thrust into the plate, substantially as described.

27. The combination of a reciprocating cutter-head, a rotatable transfer device mounted thereon and reciprocated thereby, and provided with ways or openings to receive one end of a row of splints at intervals apart, and a splint-receiving plate or holder into which the opposite ends of the splints are introduced, substantially as described.

28. The combination of a reciprocating cutter-head, a rotatable transfer device mounted thereon and reciprocated thereby, means for intermittently rotating said device, and means for removing the splints therefrom while the cylinder is at rest, substantially as described.

29. The combination of a reciprocating cutter-head, a rotatable transfer device mounted thereon, means for exhausting air from said device, means for intermittently rotating the same, and a splint-receiving plate or holder into which the splints are thrust by said device, substantially as described.

30. The combination of a reciprocating cutter-head, means for feeding wood thereto, a transfer device mounted on said head, means for exhausting air from said device, and a splint-receiving plate or holder into which the splints are thrust, substantially as described.

31. The combination of a reciprocating cutter-head, means for feeding wood thereto, a rotatable transfer-cylinder mounted on said head, said cylinder being provided with circumferential openings to which the splints are laterally applied, means for exhausting air from said cylinder, and a splint-receiving plate or holder into which the splints are thrust by said cylinder, substantially as described.

32. The combination of a reciprocating cutter-head, means for feeding wood thereto, a rotatable transfer device mounted on said head, means for intermittently rotating said device, a splint-receiving plate or holder into which the splints are inserted by the transfer device, and means for temporarily locking said device, substantially as described.

33. The combination with a carrier provided with hollow guides, the supporting and operating parts for said carrier, of a hollow splint-receiving device communicating with said guides, means for exhausting the air from said device by way of the guides, means for presenting or directing splints to said device, and a plate or holder into which the splints are endwise inserted by said device, substantially as described.

34. The combination, with a carrier provided with hollow guides, the supporting and operating parts for said carrier, of a hollow rotatable device communicating with said guides, means for exhausting the air from said device by way of the guides, means for directing or presenting splints to said device a plate or holder, and means for actuating said device to effect the introduction of the splints endwise to said plate or holder, substantially as described.

35. In a match-making machine, the combination, with a carrier, its supporting and operating parts, cutters on said carrier, and means for feeding wood to the cutters, of a transfer device mounted on the carrier and adapted to receive the splints as they are cut, means for exhausting the air from said device, and a rack or holder to which the splints are directed by the transfer device, substantially as described.

36. In a match-making machine, the combination, with a carrier, its supporting and operating parts, cutters on said carrier, and means for feeding wood to the cutters, of a rotatable transfer device mounted on said carrier, means for intermittently rotating the same, and a plate or holder to which the splints are directed by the transfer device, substantially as described.

37. In a match-making machine, the combination, with a carrier, its supporting and operating parts, cutters on said carrier, and means for feeding wood to the cutters, of a rotatable transfer device mounted on said carrier, means for exhausting the air therefrom, means for intermittently rotating said device, and a plate or holder to which the splints are directed by the transfer device, substantially as described.

38. In a match-making machine, the combination, with a carrier, its supporting and operating parts, cutters on said carrier, and means for feeding wood to the cutters, of a rotatable transfer device mounted on said carrier, means for intermittently rotating the same, and a plate or holder to which the splints are directed by the transfer device, together with means for temporarily locking said device, substantially as described.

39. In a match-making machine, the combination, with a carrier provided with hollow guides, the supporting and operating parts for said carrier, cutters on the carrier, and means for feeding wood to the cutters, of a hollow transfer device mounted on the carrier and communicating with said guides, means for exhausting air from the device by way of said guides, and a plate or holder to which the splints are directed by the transfer device, substantially as described.

40. In a match-making machine, the combination, with the cutters, and means for supporting and operating the same, of a rotatable cylinder mounted on the cutter-support and provided with circumferential openings or slots corresponding in number and position with the cutters so as to receive the splints as they are cut, means for exhausting the air from said cylinder, and means for intermittently turning the cylinder, substantially as described.

41. In a match-making machine, the combination, with the cutters, and means for supporting and operating the same, of a rotatable cylinder provided with circumferential openings or slots corresponding in number and position with the cutters so as to receive the splints as they are cut, said openings or slots being graduated in size as described, means for exhausting the air from the ends of said cylinder, and means for intermittently turning the cylinder, substantially as described.

42. In a match-making machine, the combination, with the cutters and means for supporting and operating them, of a rotatable cylinder provided with circumferential openings or slots corresponding in number and position with the cutters so as to receive the splints as they are cut, means for exhausting the air from said cylinder, means for intermittently turning the cylinder, a plate or holder, and means for actuating the cylinder to thrust the splints into said plate or holder, substantially as described.

43. In a match-making machine, the combination, with the cutters, and means for supporting and operating them, of a rotatable cylinder provided with circumferential openings or slots arranged to receive the splints as they are cut, an abutment or thrust-bar on the cylinder, means for exhausting the air therefrom, a plate or holder, and means for actuating the cylinder to thrust the splints into said plate or holder, substantially as described.

44. In a machine for making matches, the combination, with the cutters, and means for supporting and operating them, of a rotatable cylinder provided with two diametrically opposite series of openings, means for intermittently rotating said cylinder to bring the series successively into line with the cutters so as to receive the rows of splints as they are successively cut, means for exhausting the air from the cylinder, and means for removing the splints from the cylinder at predetermined intervals, substantially as described.

45. In a machine for making matches, the combination, with the cutters and means for supporting and operating them, of a rotatable cylinder reciprocative with the cutters and constructed to receive the splints as they are cut, a fixed ratchet-wheel on said cylinder, a pinion, a pawl connected therewith and engaged with the ratchet-wheel, a rack engaging said pinion, a driving-shaft, a cam thereon, and connections between said cam and rack, substantially as described.

46. In a machine for making matches, the combination, with the cutters, and means for supporting and operating them, of a rotatable cylinder reciprocative with the cutters, and constructed to receive the splints as they are cut, means for intermittently rotating said cylinder, bolts to lock said cylinder at predetermined intervals, a driving-shaft, a cam thereon, and connections between said cam and the bolts, substantially as described.

47. A hollow transfer-cylinder for match-making machines, said cylinder being provided with circumferential openings therein that communicate with the interior of the cylinder, and such openings being formed at right angles to the axial line of the cylinder, in combination with a reciprocative support for said cylinder, means for reciprocating said support, and means for exhausting the air from the cylinder substantially as described.

48. In a match-making machine, a plate-supply hopper provided with lateral horizontal flanges therein reduced at their forward ends, and with a strip or ledge at the rear of and slightly above said flanges, the lowermost plate in the hopper normally resting upon said strip or ledge and upon the flanges, and the superposed plates resting upon said lowermost plate in combination with means for withdrawing the lowermost plate step by step from the hopper, whereby when the said latter plate is withdrawn from the ledge the plate is bodily sustained upon the flanges, and the contiguous plate is sustained at one end upon the ledge and at its opposite end upon the underlying plate, substantially as described.

49. In a match-making machine, a plate-supply hopper provided with plate-supports therein, and with a strip or ledge at the rear of and slightly above said supports, the lowermost plate in the hopper normally resting upon said strip or ledge and upon the supports, and the superposed plates resting upon said lowermost plate, in combination with means for withdrawing the lowermost plate step by step from the hopper, whereby when the said latter plate is withdrawn from the ledge the plate is bodily sustained upon the supports, and the contiguous plate is sustained at one end upon the ledge and at its opposite end upon the underlying plate, substantially as described.

50. In a match-making machine, a plate-supply hopper provided with lateral horizontal flanges therein having at their forward ends beveled impact-pieces, together with a strip or ledge at the rear of and slightly above said flanges, the lowermost plate in the hopper normally resting upon said strip or ledge and upon the supports, and the superposed plates resting upon said lowermost plate, in combination with means for withdrawing the lowermost plate step by step from the hopper, whereby when the said latter plate is withdrawn from the ledge the plate is bodily sustained upon the supports, and the contiguous plate is sustained at one end upon the ledge and at its opposite end upon the underlying plate, substantially as described.

51. In a match-making machine, a hopper, splint-holding plates therein, means for moving the successive plates step by step from the hopper, and means for thrusting splints into the plates immediately below the forward end of the hopper, substantially as described.

52. In a machine for making matches, the combination of a reciprocating cutter-head, mechanism for reciprocating the same, a transfer device mounted on said head, means for feeding wood to the cutters, splint-receiving plates, into which the splints are inserted by said device, means for actuating said plates in concert with the transfer device, and mechanism for arresting the wood-feeding means and the plate-actuating means independently of the mechanism for reciprocating the cutter-head, substantially as described.

In testimony whereof I have hereunto affixed my signature in the presence of two subscribing witnesses.

JOSEPH C. DONNELLY.

Witnesses:
ANDREW V. GROUPE,
JOHN R. NOLAN.